United States Patent
Li et al.

(10) Patent No.: US 12,438,554 B1
(45) Date of Patent: Oct. 7, 2025

(54) SYSTEM AND METHOD FOR FEDERATED TWO-STAGE COMPRESSION WITHIN A PERSISTENT COGNITIVE MACHINE

(71) Applicant: AtomBeam Technologies Inc., Moraga, CA (US)

(72) Inventors: Zhu Li, Overland Park, KS (US); Paras Maharjan, Kansas City, MO (US); Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/245,413

(22) Filed: Jun. 23, 2025

Related U.S. Application Data

(63) Continuation-in-part of application No. 18/890,748, filed on Sep. 19, 2024, now Pat. No. 12,373,739, which is a continuation-in-part of application No. 18/623,018, filed on Mar. 31, 2024, now Pat. No. 12,119,848.

(51) Int. Cl.
*H03M 7/00* (2006.01)
*H03M 7/30* (2006.01)

(52) U.S. Cl.
CPC .................. *H03M 7/3082* (2013.01)

(58) Field of Classification Search
CPC .................................. H03M 7/3082
USPC ..................................... 341/50, 51
See application file for complete search history.

(56) References Cited

U.S. PATENT DOCUMENTS

| | | | |
|---|---|---|---|
| 6,611,800 B1* | 8/2003 | Nishiguchi | G10L 19/0208 704/221 |
| 6,990,246 B1 | 1/2006 | Ferguson | |
| 7,295,614 B1* | 11/2007 | Shen | H04N 19/94 375/E7.146 |
| 7,610,198 B2* | 10/2009 | Thyssen | G10L 19/07 704/201 |
| 10,827,039 B1 | 11/2020 | Dandekar et al. | |
| 2003/0072494 A1* | 4/2003 | Onno | H03M 7/3082 382/253 |
| 2005/0004795 A1* | 1/2005 | Printz | G10L 17/00 704/E15.045 |
| 2007/0055509 A1* | 3/2007 | Vasilache | H03M 7/3082 704/E19.044 |
| 2016/0300581 A1* | 10/2016 | Grancharov | G10L 19/18 |
| 2020/0296408 A1* | 9/2020 | Kim | H04N 19/463 |
| 2021/0232544 A1 | 7/2021 | Cooper et al. | |
| 2023/0019128 A1 | 1/2023 | Zeghidour et al. | |

\* cited by examiner

*Primary Examiner* — Jean B Jeanglaude
(74) *Attorney, Agent, or Firm* — Galvin Patent Law LLC; Brian R. Galvin

(57) ABSTRACT

A system and method for federated two-stage compression with federated joint learning. The system and method proposed allow for fast and efficient lossless data compression of a large variety of data types. The system and method have a variety of real-world applications, including deep learning solutions for telemetry, tracking, and command subsystems for satellites. Satellites and their control centers are incredibly spaced apart which makes data compression an extremely important process to transmit large sets of information in a low-latency, high-efficiency environment. The proposed system and method utilize probability prediction driven arithmetic long short-term memory system for data compression.

10 Claims, 22 Drawing Sheets

SYSTEM AND METHOD FOR FEDERATED TWO-STAGE COMPRESSION WITHIN A PERSISTENT COGNITIVE MACHINE

CROSS-REFERENCE TO RELATED APPLICATIONS

Priority is claimed in the application data sheet to the following patents or patent applications, each of which is expressly incorporated herein by reference in its entirety:
Ser. No. 18/890,748
Ser. No. 18/623,018

BACKGROUND OF THE INVENTION

Field of the Art

The present invention is in the field of data compression, and more particularly is directed to the problem of efficiently compressing large sets of data without losing information.

Discussion of the State of the Art

Data compression plays an integral part in manipulating vast sets of information. The process allows data to be compressed into a smaller, more manageable format which allows the data to be analyzed, processed, and transferred. An ideal method for data compression attempts to preserve as much of the original information as possible while also being fast and efficient. Generally, there are two main categories of data compression: lossless compression and lossy compression.

Lossless data compression is a process where none of the original information is sacrificed in the compression process. Information that has been compressed using a lossless compression algorithm will be exactly reproduced when the information is decompressed. This process is typically used for data types such as text files, executable programs, and some images. By contrast, lossy data compression algorithms sacrifice some of the original information in the compression process to achieve higher compression ratios. When information that has been compressed using a lossy compression algorithm is decompressed, the resulting file will be similar to the original information, but some portions of the original information may be missing. This method is generally reserved for file types such as Joint Photographic Experts Groups (JPEGs), Moving Picture Experts Groups (MPEGs), and MPEG Audio Layer III (MP3) files. With JPEGs, MPEGs, and MP3s, original information can still be identified even if some information is lost after the compression and decompression process. A third approach to data compression is transform coding where information is translated into a domain separate from the original domain. This process includes processes such as Discrete Cosine Transforms (DCT) and Discrete Wavelet Transforms (DWT) which are most commonly associated with the compression of images and audio files.

One area where data compression has become exceedingly important is related to telemetry, tracking, and command (TT & C) subsystems which are used in satellite systems. TT & C subsystems play a crucial role in facilitating essential communications between satellites and ground stations. In many cases, TT & C subsystems are the sole means through which satellites' operations and status can be monitored and controlled remotely from earth. Many satellite systems demand transmitting massive quantities of information over large distances; a process which becomes exponentially easier when the information is compressed.

What is needed is a system and method for learning-based lossless data compression where information can be reliably and efficiently compressed with low-latency and without the loss of information during compression. By integrating a plurality of neural networks into a compression system and method, information can be reliably compressed with low-latency and high efficiency all while keeping the original information intact throughout the process.

SUMMARY OF THE INVENTION

Accordingly, the inventor has conceived and reduced to practice, a system and method for federated two-stage compression within a persistent cognitive machine. The system and method proposed allow for fast and efficient lossless data compression of a large variety of data types. The system and method have a variety of real-world applications, including deep learning solutions for telemetry, tracking, and command subsystems for satellites. Because satellites and their control centers are incredibly spaced apart, data compression for information flowing between the two needs to be low-latency and high efficiency. Additionally, the proposed system and method utilize probability prediction driven arithmetic coding which provide faster encoding times and higher compression ratios when paired with a long short-term memory system for data compression.

According to a preferred embodiment, a computer system comprising: a hardware memory, wherein the computer system is configured to execute software instructions stored on nontransitory machine-readable storage media that: initialize a persistent cognitive state with language and reasoning capabilities; generate thoughts within the persistent cognitive machine; convert thoughts into vector representations in abstract space; process the vector representations through a compression network; convert the plurality of compressed thought data into a plurality of codewords using a plurality of codebooks; and store the codewords in a thought cache, is disclosed.

According to another preferred embodiment, a method for federated two-stage compression with federated joint learning, comprising the steps of: initializing a persistent cognitive state with language and reasoning capabilities; generating thoughts within the persistent cognitive machine; converting thoughts into vector representations in abstract space; processing the vector representations through a compression network; converting the plurality of compressed thought data into a plurality of codewords using a plurality of codebooks; and storing the codewords in a thought cache, is disclosed.

According to an aspect of an embodiment, the plurality of codewords are transmitted to a cloud that converts the plurality of codewords into a plurality of codewords using a universal codebook.

According to an aspect of an embodiment, the plurality of universal codewords are used to train a large codeword model.

According to an aspect of an embodiment, updated models of the lightweight codeword model or the compression network may be stored in and transferred between the edge server, the midserver, and the cloud.

According to an aspect of an embodiment, a plurality of codebooks may be stored on the midserver and used to generate codewords for a plurality of edge servers, wherein each edge server has its own specific set of codewords

BRIEF DESCRIPTION OF THE DRAWING FIGURES

DETAILED DESCRIPTION OF THE INVENTION

Figure 1:
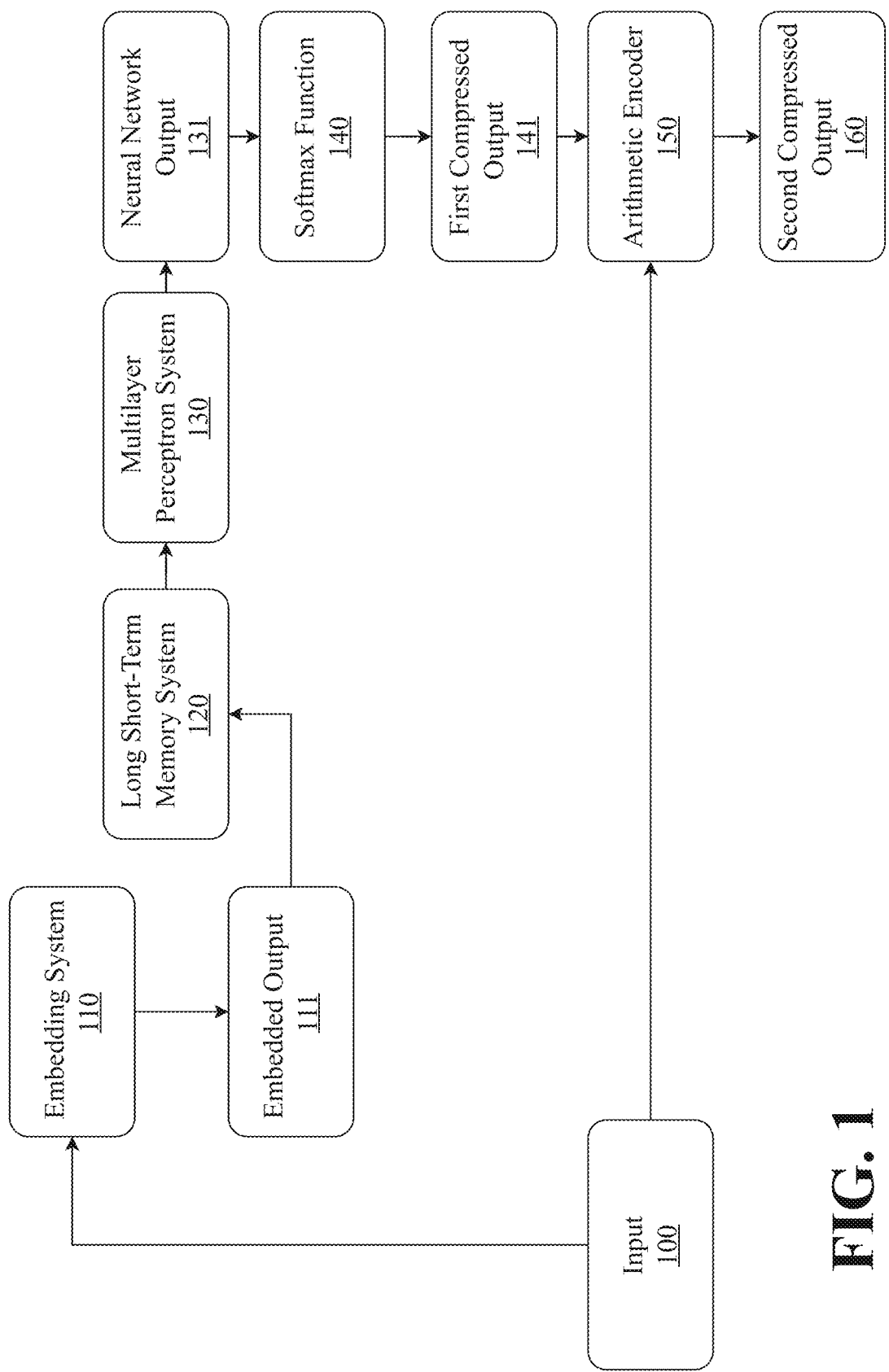
FIG. 1 is a block diagram illustrating an exemplary system architecture for learning-based lossless data compression.

The inventor has conceived, and reduced to practice, a system and method for federated two-stage compression within a persistent cognitive machine.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for learning-based lossless data compression. In one embodiment, the system and method may comprise an input 100, an embedding system 110, an embedded output 111, a long short-term memory system (LSTM) 120, a multilayer perceptron system 130, a neural network output 131, a SoftMax function 140, a first compressed output 141, an arithmetic encoder 150, and a second compressed output 160. In one embodiment, the embedding system 110 receives the input 100 or plurality of inputs 100 from a source. The input 100 may include, but is not limited to a text file, a video file, an audio file, or any other file which includes a plurality of information. The embedding system 110 prepares an input 100 for further processing by a plurality of neural network systems. The embedding system 110 turns the input 100 into an embedded output 111 which may then be processed by a long short-term memory system 120.

In one embodiment, the long short-term memory system 120 is a plurality of recurring neural network architectures which further processes the embedded output 111 for compression. The LSTM 120 is a special kind of recurring neural network where the present output depends on the LSTM's understanding of the previous output. The LSTM 120 is capable of learning long term dependency through the use of a plurality of gates that allows the LSTM 120 to add and remove information to a cell state. After an embedded output 111 is processed by the LSTM 120, the embedded output 111 is processed by the multilayer perceptron system 130. The multilayer perceptron system (MLP) 130 is a neural network which uses a PAQ algorithm to achieve data compression. A PAQ algorithm refers to a plurality of lossless data compression algorithms which are exceptionally effective and have high compression ratios for many different data types. In one embodiment, the MLP 130 may be a shallow MLP where a plurality of inputs are operated on by a plurality of weights which creates a large linear plurality of hidden nodes which are grouped into sets. The plurality of hidden nodes may be operated on by a small plurality of additional weights which converges the hidden nodes into a single output node. A key feature of a shallow MLP 130 is that the plurality of hidden nodes are operated on by the additional weights in one step, rather than a plurality of steps. In one embodiment, the embedded output 111 which has been processed by the LSTM 120 is transformed by the MLP 130 which may be a shallow MLP 130 into a neural network output 131. The neural network output 131 may then be operated on by a SoftMax function 140 which generates a compressed output 141. The compressed output 141 is a compressed version of the input 100 where no information has been lost during the compression process.

In another embodiment, the first compressed output 141 may then be passed to an arithmetic encoder 150 which may also receive the input 100. The arithmetic encoder 150 may generate a probability output by analyzing and processing the input 100 and the first compressed output 141. The arithmetic encoder 150 may also receive the input 100 and the first compressed output 141 where it generates a second compressed output 160. Generally, an arithmetic encoder receives a string with a length which is compressed to the shortest byte string which represents a number (X) within a particular range. In some embodiments, the arithmetic encoder 150 may be an arithmetic encoder in PAQ. An arithmetic encoder in PAQ maintains for each prediction an upper and lower limit on X. Concluding each prediction, the current range of X is split into parts representing the probabilities that the next bit of the string is either a 0 or a 1, which may be based on previous bits of the string. The next bit may then be encoded by selecting a new range to take place of the previous range of X. Generally, the upper and lower limits are represented in three segments. The first segment generally has the same base-256 digits and are often presented as the leading bytes of X. The next segment is generally stored in memory which the first digit in the segment varies from the remaining digits. The remaining segment is generally assumed to be zeros for the lower limit and ones for the upper limit. In one embodiment, compression may cease when one or more bytes are written from the lower bound of X.

Figure 2:
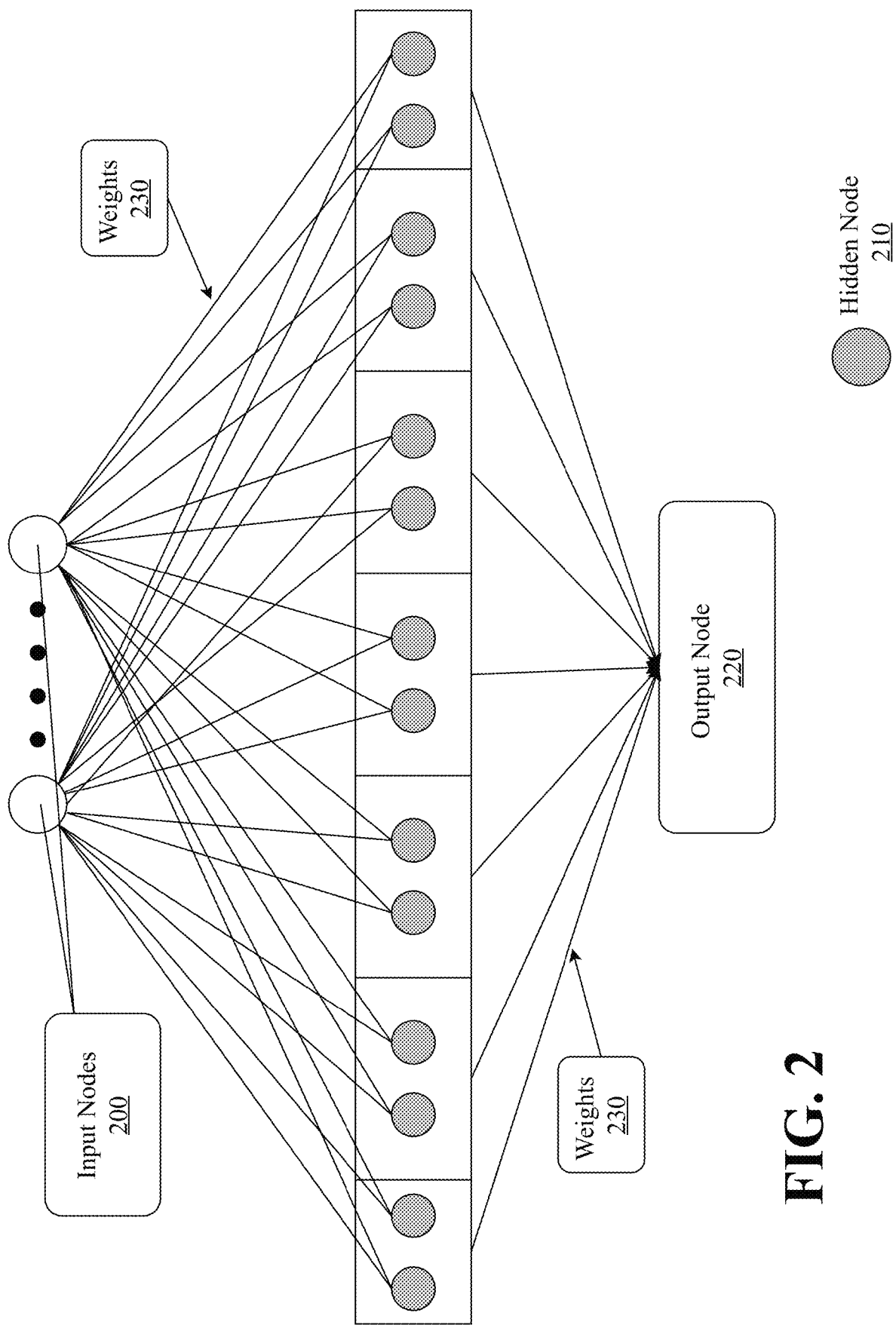
FIG. 2 is a block diagram illustrating an exemplary architecture for a subsystem of the system for learning-based lossless data compression, a multilayer perceptron system.

FIG. 2 is a block diagram illustrating an exemplary architecture for a subsystem of the system for learning-based lossless data compression, a multilayer perceptron system 130. In an embodiment, the multilayer perceptron system 130 may receive a plurality of inputs which begin as input nodes 200. The plurality of input nodes 200 are operated on by a plurality of predetermined weights. The plurality of predetermined weights 230 creates a plurality of hidden nodes 210 which may exist in a grouped sequence. In one embodiment, there may be 552 input nodes where are operated on by 3080 weights. This creates 3080 new hidden nodes which exist in seven sets, each set containing a plurality of hidden nodes 210. Each set of hidden nodes 210 is then operated on by an additional layer of weights 230 which may or may not be similar to the weights used on the input nodes. In embodiment where the hidden nodes 210 exist in seven sets, there will be seven additional weights. The additional weights act on the sets of hidden nodes 210 to create a plurality of output nodes 220.

Figure 3:
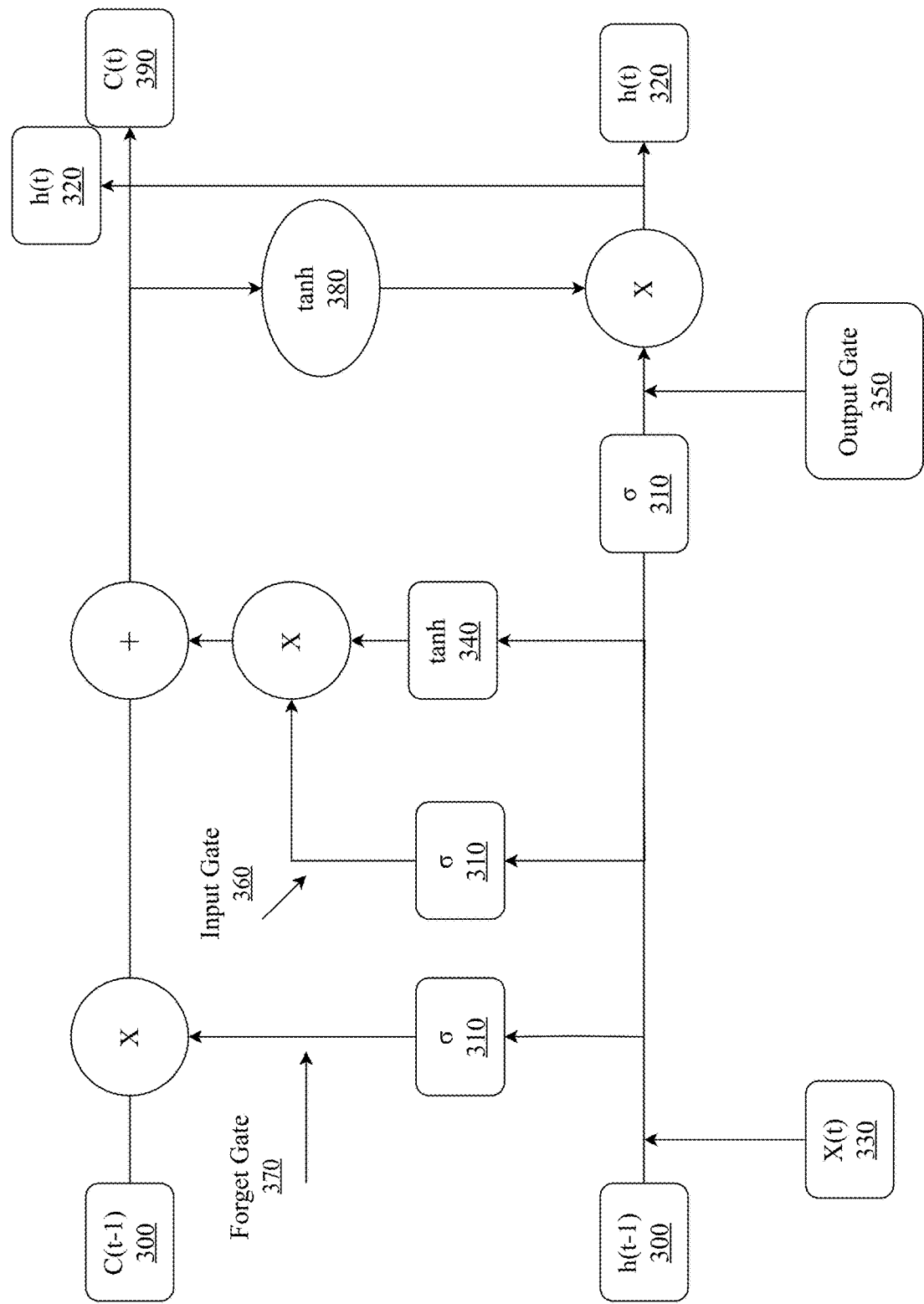
FIG. 3 is a block diagram illustrating an exemplary architecture for a subsystem of the system for learning-based lossless data compression, a long short-term memory system.

FIG. 3 is a block diagram illustrating an exemplary architecture for a subsystem of the system for learning-based lossless data compression, a long short-term memory system 120. In one embodiment, the LSTM system 120 is further comprised of a plurality of functions where the present output depends on understanding the previous output. The LSTM system 120 is capable of learning long term dependency and a plurality of gates allow the system to add and remove information to a cell state. The flow state in FIG. 3 may be governed by the following functions in one embodiment:

$$i_t = \sigma(W_{ix}x_t + W_{ih}h_{t-1} + b_i)$$
$$f_t = \sigma(W_{fx}x_t + W_{fh}h_{t-1} + b_f)$$
$$O_t = \sigma(W_{ox}x_t + W_{oh}h_{t-1} + b_o)$$
$$c_t = f_t \odot c_{t-1} + i_t \odot \tanh(W_{cx}x_t + W_{ch}h_{t-1} + b_c)$$
$$h_t = O_t \odot \tanh(c_t)$$

Where $i_t$ represents an input gate 360, $f_t$ represents a forget gate 370, and $O_t$ represents an output gate 350. The forget gate 370 allows the system to remove information from a cell state, the input gate 360 allows the system to add information to a cell state, and the output gate 350 allows the system to output information from a cell state.

Detailed Description of Exemplary Aspects

Figure 4:
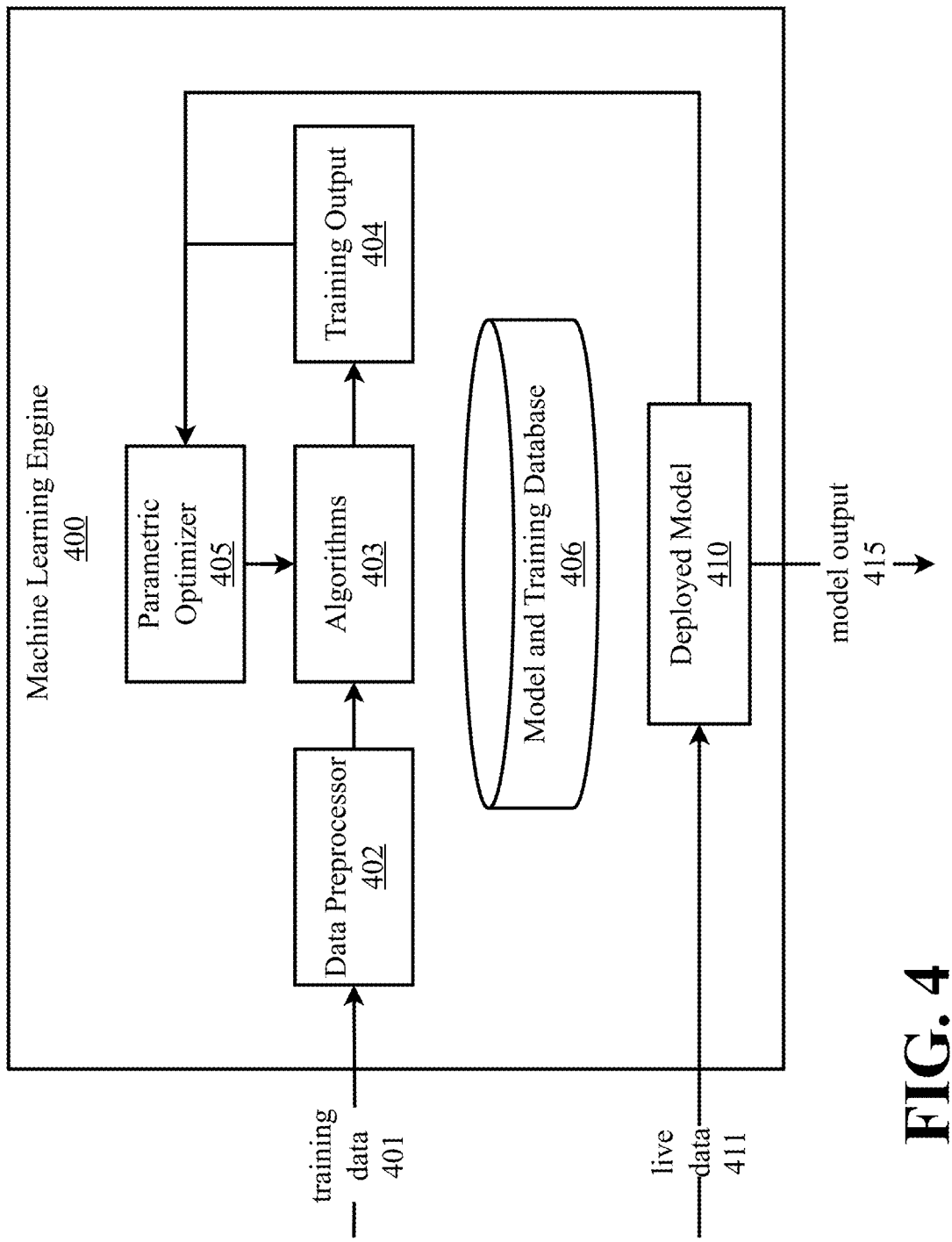
FIG. 4 is a block diagram illustrating an exemplary machine learning model for either the multilayer perceptron system or the long short-term memory system.

FIG. 4 is a block diagram illustrating an exemplary machine learning model for either the multilayer perceptron system or the long short-term memory system. According to the embodiment, the multilayer perceptron system 130 or the long short-term memory system 120 may comprise a machine learning engine 400 which may further comprise a model training stage comprising a data preprocessor 402, one or more machine and/or deep learning algorithms 403, training output 404, and a parametric optimizer 405, and a model deployment stage comprising a deployed and fully trained model 410 configured to perform tasks described herein such as transcription, summarization, agent coaching, and agent guidance. Machine learning engine 400 may be used to train and deploy a long short-term memory system 120 and the multilayer perceptron system 130 in order to support the services provided by the lossless data compression system.

At the model training stage, a plurality of training data 401 may be received by the machine learning engine 400. In some embodiments, the plurality of training data may be obtained from one or more database(s) 108 and/or directly from various information sources such as a plurality of contact centers 120. In a use case, a plurality of training data may be sourced TT & C satellite subsystems. It could include text files, audio or video files, or other forms of data. Data preprocessor 402 may receive the input data and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machines and/or deep learning algorithms 403 to train a predictive model for object monitoring and detection.

During model training, training output 404 is produced and used to measure the accuracy and usefulness of the predictive outputs. During this process a parametric optimizer 405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tan h, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop. In some implementations, various accuracy metrics may be used by machine learning engine 400 to evaluate a model's performance. Metrics can include, but are not limited to, information loss, latency, and resource consumption.

A model and training database 406 is present and configured to store training/test datasets and developed models. Database 406 may also store previous versions of models. According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 403 may comprise a deep learning algorithm such as neural networks (e.g., recurrent, convolutional, long short-term memory networks, etc.).

In some implementations, ML engine 400 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in model and training database 406.

Figure 5:
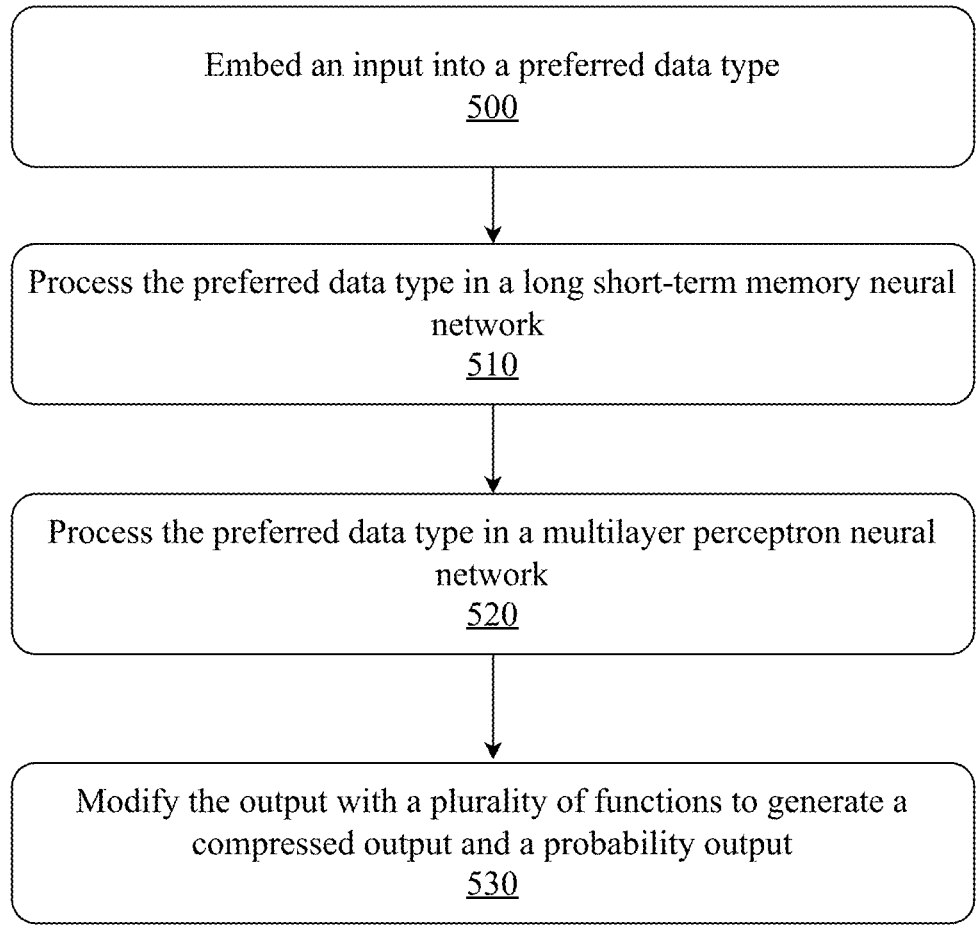
FIG. 5 is a flow diagram illustrating an exemplary method of learning-based data compression.

FIG. 5 is a flow diagram illustrating an exemplary method of learning-based data compression. In a first step 500, embed an input into a preferred data type. The input may be a data type including but not limited to, text files, audio files, video files, and any other data type which carries information. In a step 510, process the preferred data type in a long short-term memory neural network. In a step 520, process the preferred data type in a multilayer perceptron neural network which creates an output. In a step 530, modify the output with a plurality of functions to generate a compressed output and a probability output. The plurality of functions may include a SoftMax function and an arithmetic encoding algorithm.

Figure 6:
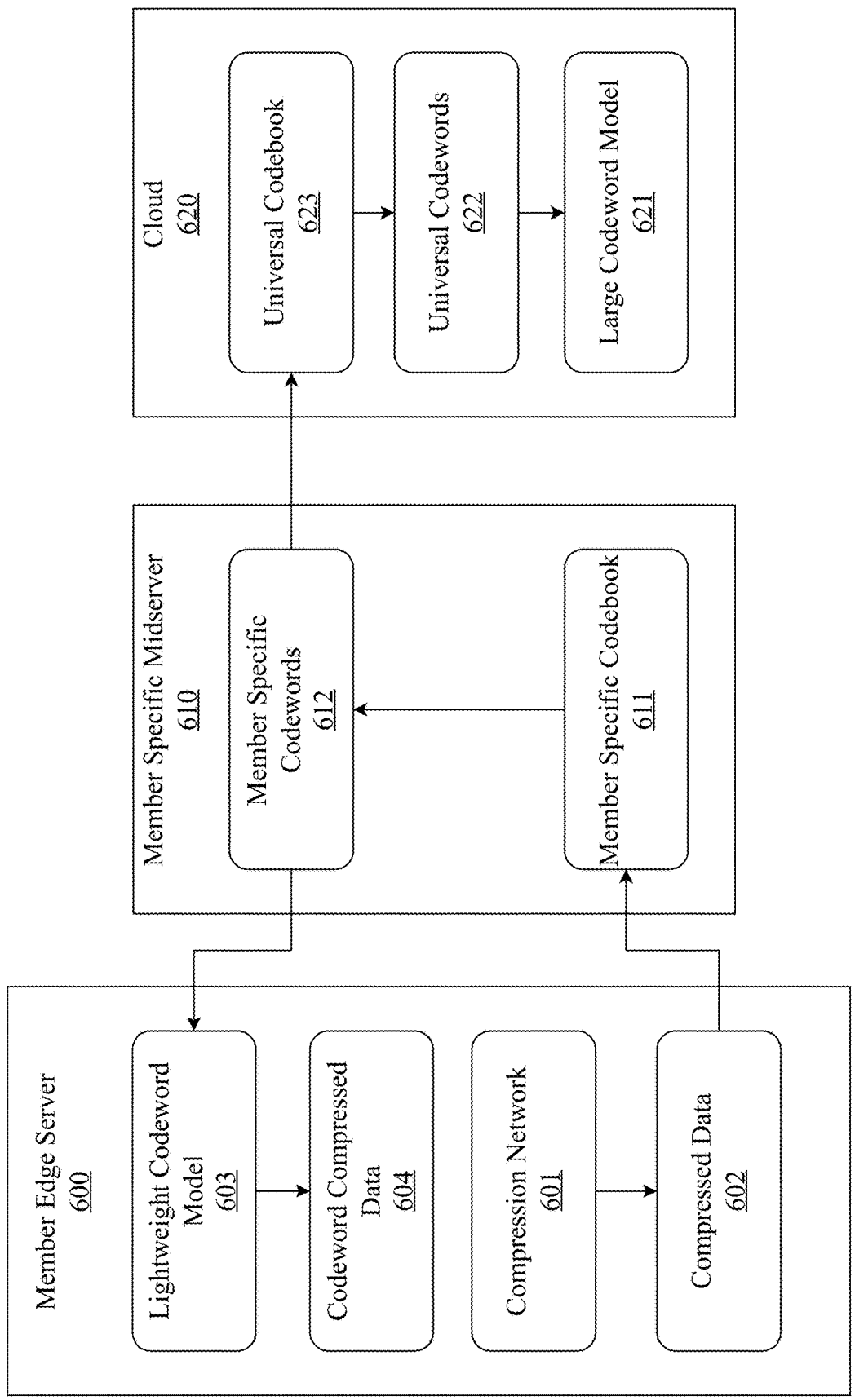
FIG. 6 is a block diagram illustrating an exemplary system architecture for a system and for federated two-stage compression with federated joint learning.

FIG. 6 is a block diagram illustrating an exemplary system architecture for a system and for federated two-stage compression with federated joint learning. Illustrated is an expanded system architecture for learning-based lossless data compression, building upon the original MLP-LSTM compression framework. The system comprises three main components: a member edge server 600, a member specific midserver 610, and a cloud 620. At the member edge server 600, a compression network 601, which may utilizes the MLP-LSTM compression technique utilized in the system for learning-based lossless data compression, processes input data to generate compressed data 602. This compressed data is then sent to the member specific midserver 610 for further processing.

The member specific midserver 610 employs a member specific codebook 611 to convert the compressed data into member specific codewords 612. These codewords represent a more compact and specialized form of the original data, tailored to the specific member's data characteristics. The member specific codewords are then relayed back to the member edge server 600, where they are used to train a lightweight codeword model 603. This model is specifically designed to handle tasks relevant to the edge server, allowing for even greater compression efficiency due to its specialized nature.

The term "lightweight codeword model" is used to describe a specialized model designed to operate efficiently on edge servers with limited computational resources. This model is considered "lightweight" because it is tailored to handle a specific, narrow set of tasks relevant to the particular edge server, rather than being a comprehensive model capable of processing a wide range of data types. The model is "codeword-based" because it operates on the codewords generated from the compressed data, which represent a more compact and efficient form of the original information.

The specialization of the lightweight codeword model to the edge server's specific data and tasks allows for greater efficiency and compression. For example, an edge server in a smart factory might have a lightweight codeword model specialized for processing sensor data from manufacturing equipment. This model would be highly efficient at compressing and analyzing data related to machine performance, temperature readings, and production metrics, but it wouldn't need to handle unrelated tasks like image recognition or natural language processing. Similarly, an edge server in an autonomous vehicle might have a lightweight codeword model optimized for processing real-time data from various sensors, cameras, and GPS systems. This model would be extremely efficient at compressing and analyzing data related to vehicle position, obstacle detection, and traffic conditions, but it wouldn't need to handle tasks irrelevant to driving. In both cases, the lightweight nature of the model, combined with its specialization to a specific set of codewords representing compressed data from a narrow domain, allows for rapid processing and highly efficient compression on resource-constrained edge devices.

In another example, an edge server in a smart home environment might use its lightweight codeword model to efficiently process and compress sensor data from various IoT devices. Another instance could be a mobile edge server utilizing its lightweight model to compress and analyze user interaction data in real-time, optimizing app performance and responsiveness.

In addition to training the lightweight model, the member specific codewords may also sent to the cloud 620 for broader analysis and model training. The cloud environment contains a universal codebook 623 that integrates the member specific codewords from various sources into a comprehensive set of universal codewords 622. These universal codewords serve as input for training a large codeword model 621 in the cloud. This larger model has broader implications and can capture patterns and insights across multiple members or data sources.

The system also allows for bidirectional flow of information. The lightweight codeword model on the edge server can be updated based on insights from the large codeword model in the cloud, ensuring that edge processing remains efficient and up-to-date. Similarly, the cloud model continuously evolves as it receives new codewords from various member specific midservers. The system is designed to support federated learning, allowing multiple member edge servers and their associated midservers to collaboratively train and improve the compression models without sharing raw data. This federated approach ensures data privacy while leveraging the collective knowledge of all participants.

In the federated learning process, each member edge server 600 trains its own version of the compression network 601 and lightweight codeword model 603 on its local data. Instead of sharing the raw data or compressed data, only the model updates (such as weights or gradients) may be sent to the cloud 620. The cloud aggregates these updates from multiple members to improve the large codeword model 621, which serves as the global model in this federated system.

The system also enables federated joint learning, where the entire pipeline-from the initial compression network to the final large codeword model-is optimized end-to-end across all participating members. This joint learning process allows the system to find the optimal balance between compression efficiency at the edge, codeword generation at the midserver, and global model performance in the cloud. During federated joint learning, the cloud 620 periodically sends updates to the member specific midservers 610 and edge servers 600. These updates help refine the member specific codebooks 611 and improve the performance of the lightweight codeword models 603 on the edge servers. This bidirectional flow of model updates ensures that each component of the system benefits from the collective learning process while maintaining the privacy of individual member data.

The federated joint learning approach also allows for personalization. While the large codeword model 621 in the cloud captures general patterns across all members, each member's lightweight codeword model 603 can be fine-tuned to its specific data distribution and tasks. This personalization improves the efficiency of edge processing while still benefiting from the broader knowledge captured in the global model.

By combining federated learning with joint optimization, this system achieves a balance between local efficiency, global performance, and data privacy. It enables collaborative learning across multiple members or organizations without the need to centralize sensitive data, making it particularly suitable for applications where data privacy and edge computing efficiency are crucial. This multi-tiered approach combines the benefits of edge computing, specialized compression, and cloud-based large-scale modeling. It enables efficient data processing and compression at the edge, while also facilitating broader analysis and model development in the cloud, all while maintaining data privacy through the use of codewords rather than raw data.

Figure 7:
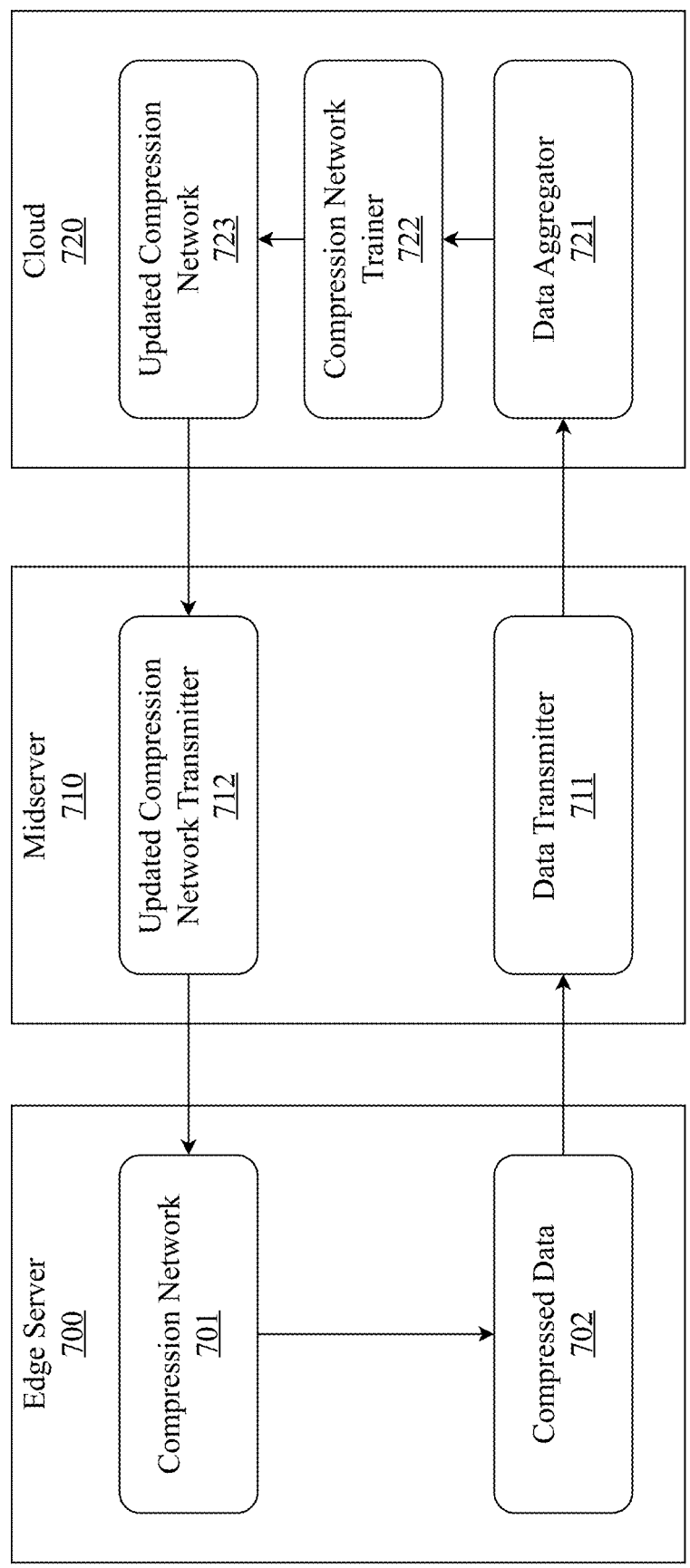
FIG. 7 is a block diagram illustrating an exemplary system architecture for a trainable compression network on an edge server.

FIG. 7 is a block diagram illustrating an exemplary system architecture for a trainable compression network on an edge server. Depicted is a training cycle for a learning-based lossless data compression system, comprising three main components: an edge server 700, a midserver 710, and a cloud environment 720. This system demonstrates how compressed data from the edge is used to update the compression model, which is then redistributed back to the edge.

At the edge server 700, a compression network 701 processes input data to generate compressed data 702. The compression network may utilizes advanced techniques such as the MLP-LSTM framework disclosed in the lossless data compression system. The compressed data 702 represents a compact form of the original information, optimized for efficient storage and transmission.

The compressed data 702 is then sent to the midserver 710, which acts as an intermediary between the edge and the cloud. The midserver contains a data transmitter 711 that securely forwards the compressed data to the cloud environment. This transmission step ensures that only the compressed form of the data, rather than raw information, leaves the edge server, enhancing data privacy and reducing bandwidth requirements. In the cloud environment 720, a data aggregator 721 collects compressed data from multiple sources, potentially including various edge servers and midservers. This aggregated data serves as input for the compression network trainer 722. The trainer analyzes the compressed data to identify patterns, inefficiencies, or areas for improvement in the current compression model.

Based on this analysis, the compression network trainer 722 updates the existing model, producing an updated compression network 723. This updated network incorporates learnings from the aggregated compressed data, potentially improving compression efficiency, accuracy, or adaptability to different types of input data. The updated compression network 723 is then sent back to the midserver 710, where an updated compression network transmitter 712 manages its secure distribution back to the edge server 700. Once received, the edge server can replace its existing compression network 701 with the updated version, completing the training cycle.

This cyclical process allows for continuous improvement of the compression model based on real-world data. By aggregating compressed data from multiple sources in the cloud, the system can learn from a diverse range of inputs, potentially leading to a more robust and efficient compression network. At the same time, by only transmitting compressed data and updated models, rather than raw data, the system maintains a high level of data privacy and efficiency. The use of a midserver 710 as an intermediary adds an extra layer of security and control, potentially allowing for additional data processing or filtering steps between the edge and the cloud. This architecture also provides flexibility, as the midserver could be tailored to specific organizational needs or regulatory requirements.

Figure 8:
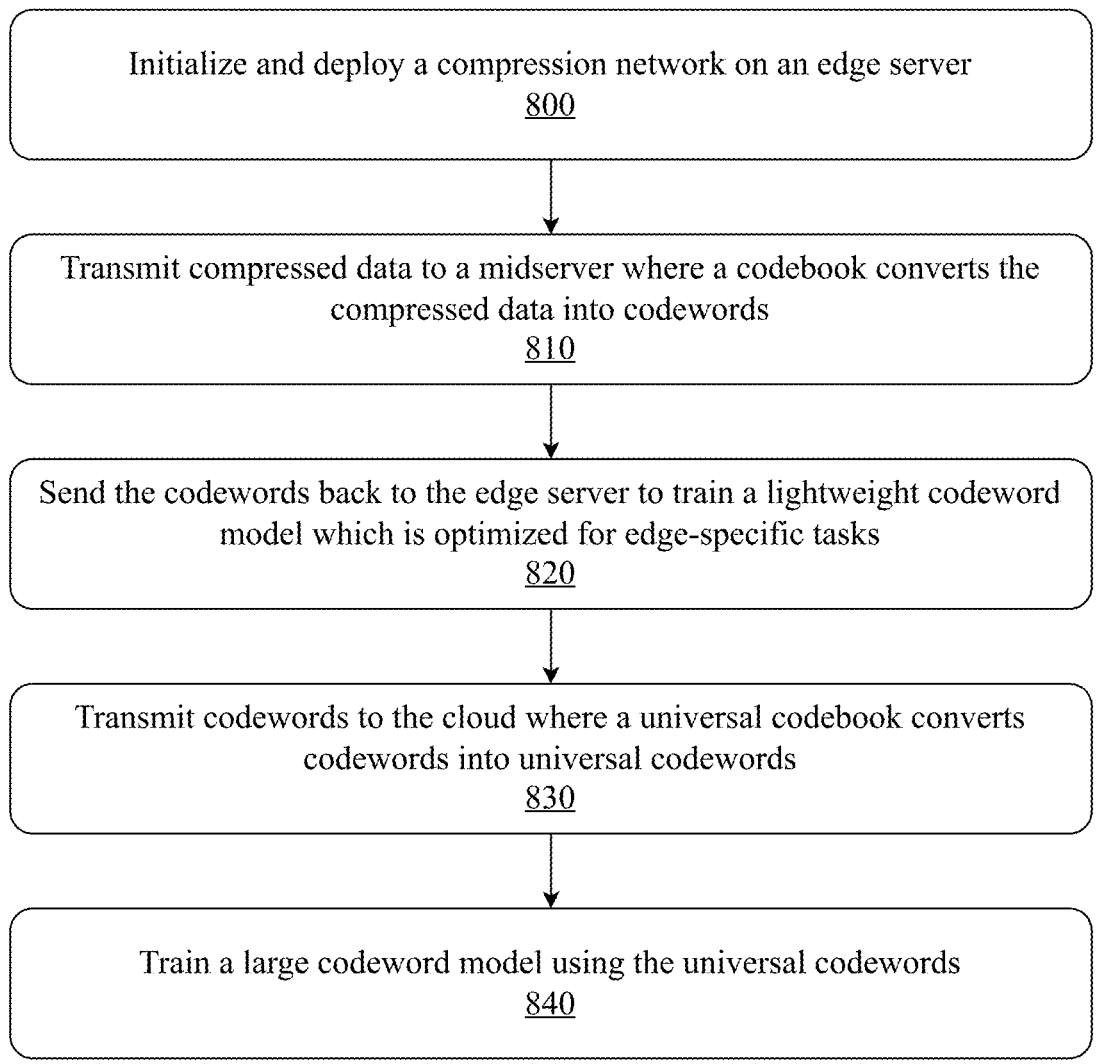
FIG. 8 is a flow diagram illustrating an exemplary method for federated two-state compression with federated joint learning.

FIG. 8 is a flow diagram illustrating an exemplary method for federated two-state compression with federated joint learning. In a first step 800, a compression network is initialized and deployed on an edge server. This step involves setting up the initial architecture of the compression network, which could be based on the MLP-LSTM framework mentioned in the original patent. The network is configured to efficiently compress data specific to the edge server's tasks. For example, in a smart home system, this network might be optimized to compress data from various IoT devices such as thermostats, security cameras, and energy meters.

In a step 810, the compressed data is transmitted to a midserver where a codebook converts the compressed data into codewords. This step involves sending the output of the compression network to a separate server that acts as an intermediary. The midserver uses a predefined codebook to transform the compressed data into a series of codewords. These codewords represent a more compact form of the data, further reducing its size while maintaining its essential information. For instance, in our smart home example, a sequence of compressed temperature readings might be converted into a single codeword representing a specific temperature pattern.

In a step 820, the codewords are sent back to the edge server to train a lightweight codeword model which is optimized for edge-specific tasks. This step is crucial for improving the efficiency of edge processing. The lightweight model learns to interpret and work directly with the codewords, allowing for faster processing and decision-making at the edge. In our smart home scenario, this model might learn to quickly identify unusual temperature patterns or predict energy usage based on the codewords, without needing to decompress the full data.

In a step 830, the codewords are transmitted to the cloud where a universal codebook converts them into universal codewords. This step broadens the scope of the data representation. The universal codebook in the cloud can interpret codewords from multiple sources and convert them into a standardized format. For example, it might convert temperature pattern codewords from various smart home systems into universal codewords that represent general climate trends.

In a step 840, a large codeword model is trained using the universal codewords. This step involves using the standardized, universal codewords to train a more comprehensive model in the cloud. This model can capture broader patterns and insights across multiple edge servers or even different types of systems. In the ongoing example, this large model might learn to identify correlations between temperature patterns, energy usage, and other factors across many smart homes, potentially leading to improved energy management strategies or predictive maintenance for HVAC systems.

Figure 9:
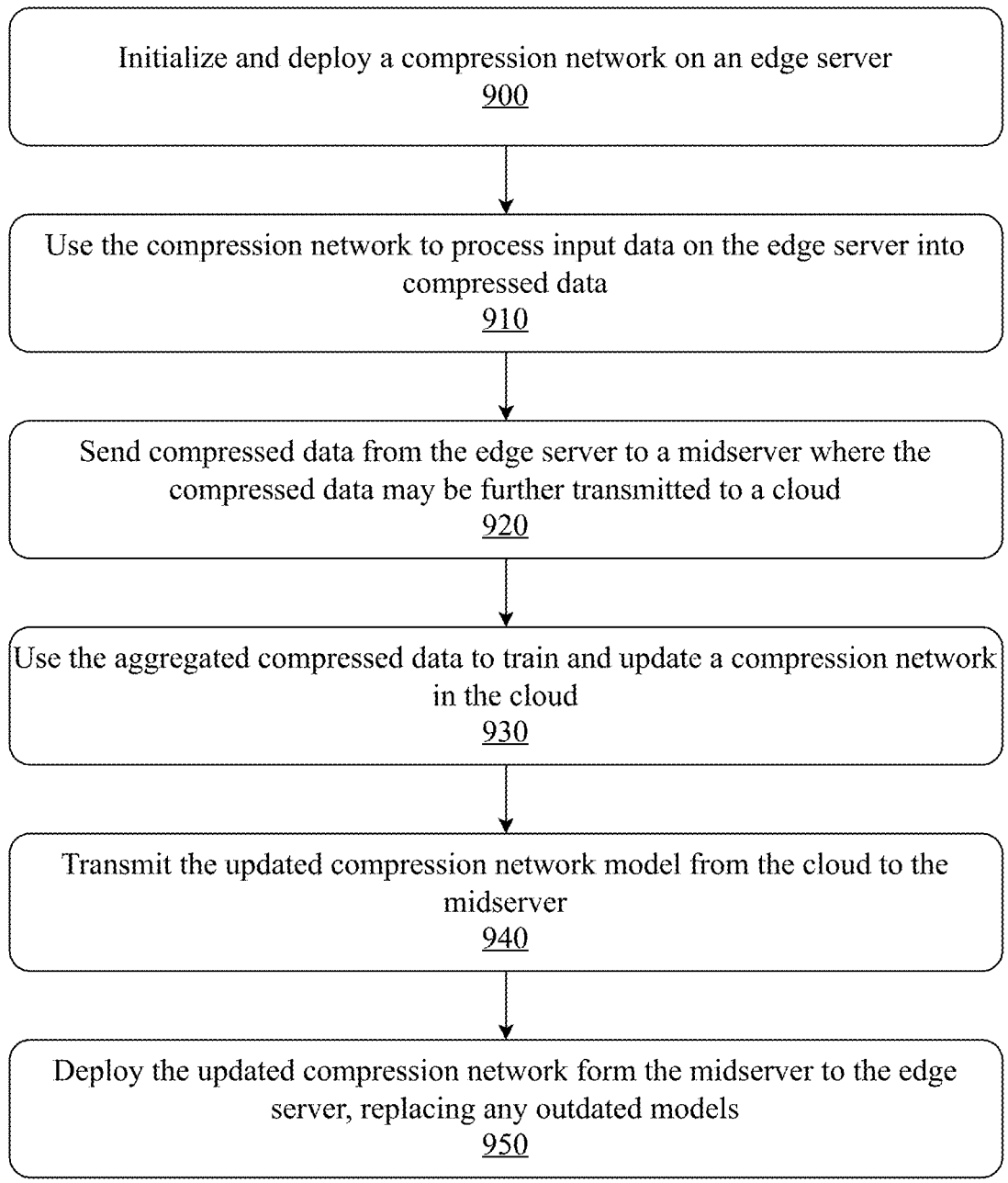
FIG. 9 is a flow diagram illustrating an exemplary method for a training and utilizing a compression network on an edge server.

FIG. 9 is a flow diagram illustrating an exemplary method for a training and utilizing a compression network on an edge server. In a first step 900, a compression network is initialized and deployed on an edge server. This step involves setting up the initial architecture of the compression network, which could be based on advanced techniques such as the MLP-LSTM framework. The network is configured to efficiently compress data specific to the edge server's tasks and environment. For instance, in a smart city traffic management system, this network might be optimized to compress data from traffic cameras, speed sensors, and vehicle counters.

In a step 910, the compression network is used to process input data on the edge server, generating compressed data. This step involves applying the current version of the compression network to incoming data streams, reducing their size while preserving essential information. In the smart city example, the network might compress real-time traffic flow data, reducing high-resolution video feeds to key metrics like vehicle count, average speed, and lane occupancy.

In a step 920, the compressed data is sent from the edge server to a midserver where it may be further transmitted to a cloud. The midserver acts as an intermediary, facilitating secure and efficient data transfer between the edge and the cloud. This step ensures that only compressed, privacy-preserving data leaves the edge environment. In the traffic management scenario, the midserver might aggregate compressed data from multiple intersections before sending it to the cloud.

In a step 930, the aggregated compressed data is used to train and update a compression network in the cloud. A compression network trainer in the cloud analyzes the collected data from multiple sources, identifying patterns and areas for improvement in the current model. For the smart city example, this might involve learning new patterns in traffic flow across different times of day, weather conditions, or special events, allowing the model to more efficiently compress and represent these scenarios.

In a step 940, the updated compression network model is transmitted from the cloud back to the midserver. This step involves securely sending the newly trained model through the network for distribution to edge servers. The updated model incorporates learnings from a wide range of data sources, potentially improving its ability to compress diverse types of traffic data more efficiently. In a step 950, the updated compression network is deployed from the midserver to the edge server, replacing any outdated models. This completes the training cycle, with the edge server now using an improved model based on aggregated data from multiple sources. In our traffic management system, this could result in more efficient compression of traffic data, potentially allowing for real-time analysis of more data streams or freeing up computational resources for other tasks.

This cyclical process allows for continuous improvement of the compression model, leveraging both edge and cloud computing resources to optimize performance and efficiency over time. It enables the system to adapt to changing data patterns and improve its compression capabilities without requiring manual intervention at each edge server. The use of midservers adds an extra layer of security and control, potentially allowing for additional data processing or filtering steps between the edge and the cloud.

Figure 10:
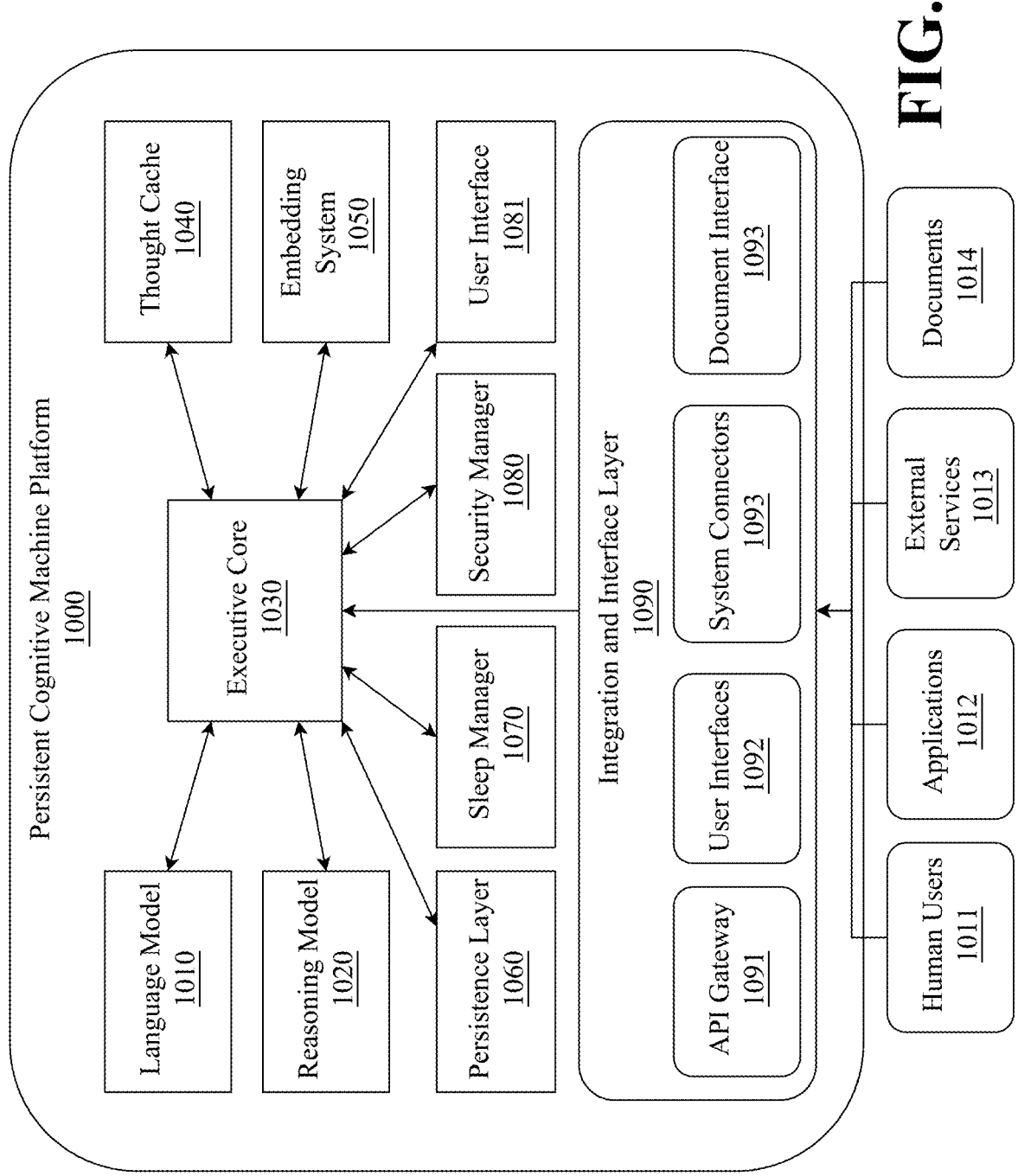
FIG. 10 is a block diagram illustrating the architecture of a persistent cognitive machine platform.

FIG. 10 is a block diagram illustrating the architecture of a persistent cognitive machine platform. The persistent cognitive machine platform 1000 represents a fundamental advancement beyond traditional artificial intelligence systems by implementing persistent cognitive capabilities. Unlike conventional language models that operate within a prompt-response paradigm, the platform 1000 maintains continuous cognitive processes regardless of external interaction, can remember previous experiences, learn from these experiences, create new thought experiences independently, and initiate interactions without waiting for external prompts.

At the core of persistent cognitive machine platform 1000 is an executive core 1030, which functions as the central orchestration component of the system. The executive core 1030 manages the overall cognitive processes, determines how to handle external stimuli, when to retrieve thoughts from the thought cache, when to engage the reasoning model, when to add new thoughts to the thought cache, and when to enter sleep states. Executive core 1030 includes a decision engine that orchestrates resource allocation and process scheduling, a state management system that tracks the operational states of the platform, and a stimulus analysis module that processes and evaluates incoming stimuli. Additionally, executive core 1030 contains a thought manager for handling curation and retrieval of thoughts, a sleep cycle controller for managing sleep states, and a thought initiation system for generating new thoughts and cognitive processes.

Connected to executive core 1030 is a language model 1010, which provides the platform with language processing capabilities. Language model 1010 enables the platform to understand and generate natural language by predicting the most likely sequence of tokens that would follow a given input sequence. Language model 1010 may incorporate a plurality of neural network architectures such as transformers and attention mechanisms, along with tokenization processes, context management, and response generation capabilities. Language model 1010 integrates with executive core 1030 to process textual inputs and generate coherent, contextually relevant outputs based on both the immediate context and the system's accumulated experiences stored in the thought cache.

Working in conjunction with the language model 1010 is a reasoning model 1020, which adds reasoning capabilities to the platform. Reasoning model 1020 extends beyond simple language processing by generating chains-of-thought when receiving input, and then using this chain-of-thought together with the original input to generate improved outputs. This component includes a chain-of-thought engine for iterative reasoning processes, problem analysis capabilities, solution synthesis, and specialized reasoning modules for different types of reasoning (mathematical, logical, causal, and analogical). Reasoning model 1020 enables the platform to engage in complex problem-solving, logical deduction, and multi-step analytical processes.

The persistent cognitive machine platform includes a thought cache 1040, which functions as the system's memory for thoughts. Thought cache 1040 is a repository for thoughts that allows the platform to remember that it has experienced something similar before and to use related thoughts to more quickly and richly engage with new stimuli. Thought cache 1040 is organized into both short-term and long-term components. The short-term cache maintains recent thought store and working memory interfaces, while the long-term cache contains embedded vector representations and semantic networks of thoughts. Thought cache 1040 interfaces with executive core 1030 to retrieve relevant thoughts based on current stimuli and to store new thoughts generated during processing.

Working with thought cache 1040 is an embedding system 1050, which converts thoughts into vector representations in a high-dimensional abstract space. Embedding system 1050 enables the efficient storage of a very large amount of thought in a way that allows related thoughts to be positioned closer than unrelated thoughts in the abstract space. Embedding system 1050 includes but is not limited to vector representation capabilities, similarity calculation for finding related thoughts, and interfaces for storing and retrieving embedded thoughts. Embedding system 1050 may implement various embedding technologies, including sentence embedding techniques.

To ensure the platform maintains its cognitive state across shutdowns and restarts, a persistence layer 1060 provides mechanisms for serializing and restoring the system state. Persistence layer 1060 includes a state manager responsible for serialization and deserialization of the platform's cognitive state, a checkpoint system for creating recovery points, and a recovery controller for managing state restoration after interruptions. Persistence layer 160 may also incorporates a storage system with primary storage, backup capabilities, and storage tiering to balance performance and reliability. Through persistence layer 1060, the platform can maintain continuity of cognition even when powered off or restarted, which is essential to the "persistent" aspect of the system.

In one embodiment, the platform includes a sleep manager 1070, which implements sleep-like states during which the platform becomes temporarily unresponsive to external stimuli to focus on internal cognitive processes. Sleep manager 1070 includes a sleep cycle scheduler for determining appropriate times to enter sleep states, a wake trigger monitor for detecting conditions that should interrupt sleep, and a thought curation processor that orchestrates sleep-state activities. During sleep states, sleep manager 1070 oversees generalization of specific thoughts to create broader concepts, memory consolidation to strengthen important connections, and insight generation through the recombination of existing thoughts. These processes mirror some aspects of biological sleep but are adapted for the platform's specific needs.

To ensure appropriate protections for the system and its data, a security manager 1080 implements comprehensive security controls. Security manager 1080 may include an access controller with authentication systems, permission management, and encryption services, as well as an integrity monitor comprising content safety filters, audit logging, and anomaly detection. A central policy enforcer within the security manager 1080 applies consistent security policies across the platform. These security measures protect both the platform itself and the sensitive information it may contain, particularly important for applications involving confidential or personal data.

User interaction with the platform is facilitated through a user interface 1081, which provides methods for humans to communicate with the system. User interface 1081 may include text-based interfaces, graphical displays, command consoles, and other interaction mechanisms appropriate to the specific application of the platform.

An integration and interface layer 1090 forms the connection between the core PCM platform and external systems or users. This layer includes several specialized interfaces for different types of integration. An API gateway 1091 provides programmatic access to the platform's capabilities, enabling other software systems to leverage its cognitive functions. User interfaces 1092 offer direct interaction points for human users, including text-based chat interfaces, graphical displays, or specialized interaction mechanisms. System connectors 1093 enable integration with external services and applications, while the document interface 1094 provides mechanisms for ingesting and processing documents and other content into the platform's thought cache.

The platform interacts with various external entities. Human users 1011 may engage with the platform directly, utilizing its cognitive capabilities through conversation or structured interactions. Applications 1012 can integrate with the platform through API calls or system connectors, incorporating persistent cognition into existing software systems. External services 1013 may provide additional capabilities or information sources that the platform can access and incorporate into its cognitive processes. Documents 1014 and other content sources provide information that the platform can ingest, analyze, and incorporate into its thought cache.

In operation, persistent cognitive machine platform 1000 maintains continuous cognitive processes even when not actively engaged with external entities. When it receives input from users or systems through integration and interface layer 1090, executive core 1030 analyzes the stimuli and determines how to respond. It retrieves relevant thoughts from thought cache 1040, processes these thoughts in conjunction with the input using the language model 1010 and reasoning model 1020 as appropriate, and generates a response. New thoughts generated during this process are encoded by embedding system 1050 and stored in thought cache 1040.

Periodically, as determined by sleep manager 1070, the platform enters sleep states to curate thoughts, consolidate memories, and perform other cognitive maintenance functions. Persistence layer 1060 ensures that the platform's cognitive state is preserved across system restarts or power interruptions, maintaining continuity of cognition. Through these processes, the platform develops increasingly rich and nuanced understanding based on its accumulating experiences, transcending the limitations of traditional prompt-response AI systems.

The persistent cognitive machine platform 1000 can be implemented through various hardware configurations, including dedicated server systems, distributed computing environments, cloud-based infrastructures, or hybrid arrangements. The specific hardware implementation may vary depending on the scale and specific application requirements, but all implementations maintain the core architectural components and functional characteristics described above.

Figure 11:
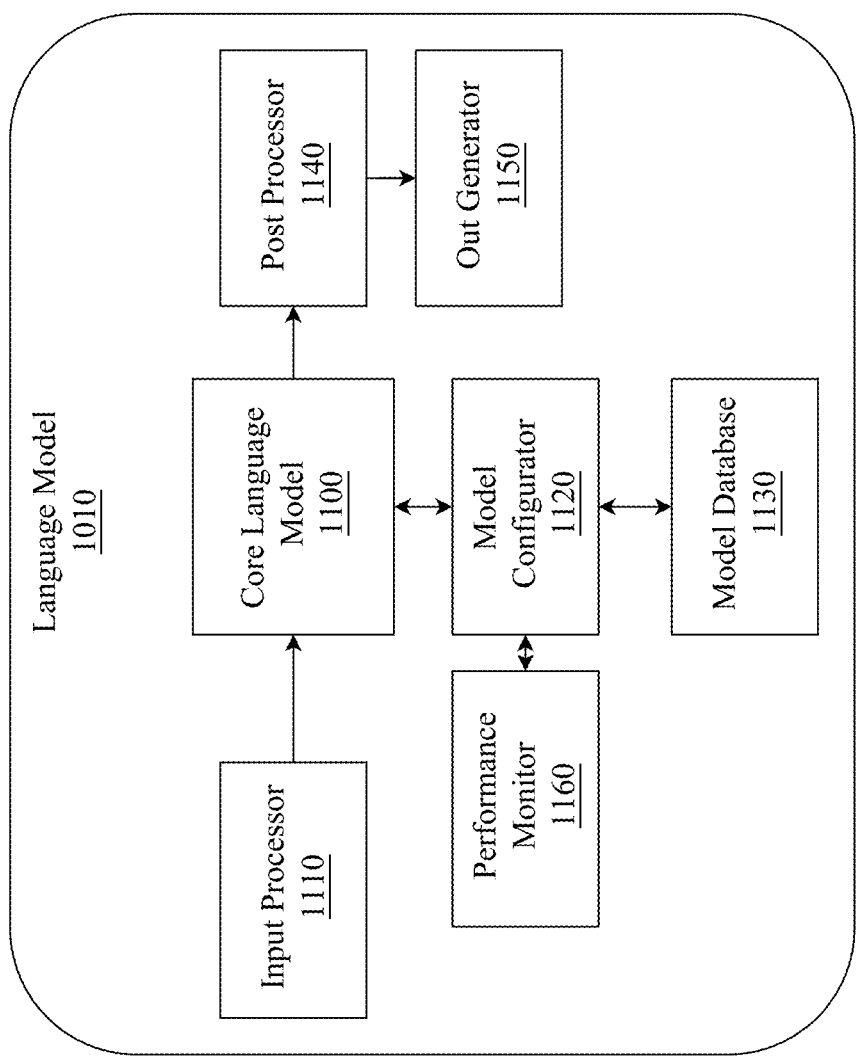
FIG. 11 is a block diagram illustrating an exemplary architecture of a component within a Persistent Cognitive Machine, a language model.

FIG. 11 is a block diagram illustrating an exemplary architecture of a component within a Persistent Cognitive Machine, a language model. Language model 1010 provides the persistent cognitive machine with language processing capabilities, enabling it to understand and generate natural language text. Unlike traditional language models that operate in isolation, language model 1010 within the PCM architecture is integrated with the executive core and thought cache to leverage both immediate context and accumulated experiences when processing language.

At the center of the language model 1010 is a core language model 1100, which implements the neural network architecture responsible for language understanding and generation. Core language model 1100 may utilize transformer-based architectures with attention mechanisms, similar to those found in state-of-the-art large language models. Similarly, core language model 1100 may utilize other architectures such as latent transformers which operate exclusively in latent vector space, architectures that include variational autoencoders, or even combinations of transformers and variational autoencoders. Core language model 1100 processes token sequences and predicts likely continuations based on learned patterns and relationships within language. Core language model 1100 serves as the foundation for all language processing within the platform but is augmented by the persistent cognitive capabilities of the broader system.

Input to the language model is managed by an input processor 1110, which handles the preprocessing of text before it reaches the core language model. The input processor 1110 performs functions including tokenization, which breaks text into manageable units (tokens) for processing by the neural network. Additionally, the input processor 1110 manages context windows, ensuring that appropriate context is maintained when processing longer sequences or ongoing conversations. This component may also handle special token insertion, prompt formatting, and other preprocessing steps necessary for effective language model operation.

A model configurator 1120 manages the operational parameters and settings of the language model. Model configurator 1120 controls aspects such as inference parameters, attention mechanisms, and other configuration settings that affect how the core language model functions. Model configurator 1120 may adjust these settings based on the specific requirements of different tasks or in response to performance feedback from the performance monitor. By dynamically configuring the language model, the system can optimize for different types of language tasks without requiring separate models for each task type.

To support the model configurator, a model database 1130 stores model weights, parameters, and configuration presets, or previously trained models. Model database 1130 may contain multiple sets of weights or parameter configurations optimized for different types of language tasks. Model database 1130 enables the language model to efficiently switch between different operational modes or to load specialized parameters for particular domains or tasks. This flexibility allows the language model to adapt to diverse requirements within the persistent cognitive machine platform.

After the core language model processes input, a post processor 1140 handles additional processing of the raw model output. Post processor 1140 may implement functions such as filtering inappropriate content, ensuring coherence across longer generations, applying formatting rules, or performing specialized post-processing for domain-specific outputs. The post processor 1140 ensures that the raw output from the neural network is refined into more usable and appropriate text before being passed to subsequent components.

The final stage in the language model pipeline is an output generator 1150, which prepares the processed language model output for use by other components of the system. Output generator 1150 handles tasks such as detokenization (converting tokens back into readable text), formatting the output according to specified requirements, and preparing the output for integration with other components of the persistent cognitive machine. This component ensures that the language model's output is properly structured for its intended use, whether that involves direct presentation to users or further processing by other system components.

Throughout the language model's operation, a performance monitor 1160 tracks various metrics related to model performance and resource utilization. Performance monitor 1160 monitors aspects such as processing time, memory usage, token consumption, and quality metrics. Additionally, performance monitor 1160 provides feedback to the model configurator to enable dynamic optimization of model parameters based on observed performance. This monitoring capability aids in maintaining efficient operation of the language model, particularly in resource-constrained environments or when processing large volumes of text.

Language model 1010 interfaces with executive core 1030 of the persistent cognitive machine platform 1000, receiving input data and instructions while providing processed language outputs. Unlike standalone language models, this component benefits from integration with the thought cache, allowing it to leverage persistent memory when generating responses. This integration enables the language model to produce outputs that reflect not only the immediate context but also the system's accumulated experiences and learned patterns.

In operation, language model 1010 receives input that may originate from external sources (via the integration and interface layer) or from internal processes within the persistent cognitive machine. Input processor 1110 prepares this input for core language model 1100, which generates initial output with guidance from model configurator 1120. This output is then refined by post processor 1140 and formatted by output generator 1150 before being provided to other components of the system or to external entities. Throughout this process, performance monitor 1160 ensures efficient operation and provides feedback for optimization.

Language model 1010 may incorporate various specialized capabilities such as multi-lingual support, domain adaptation for specific fields of knowledge, contextual understanding that spans beyond traditional context windows, coherence control for longer generations, safety filters to prevent harmful outputs, and style adaptation to match desired tones or writing styles. These capabilities allow the language model to serve as a versatile and powerful component within the broader persistent cognitive machine architecture.

Figure 12:
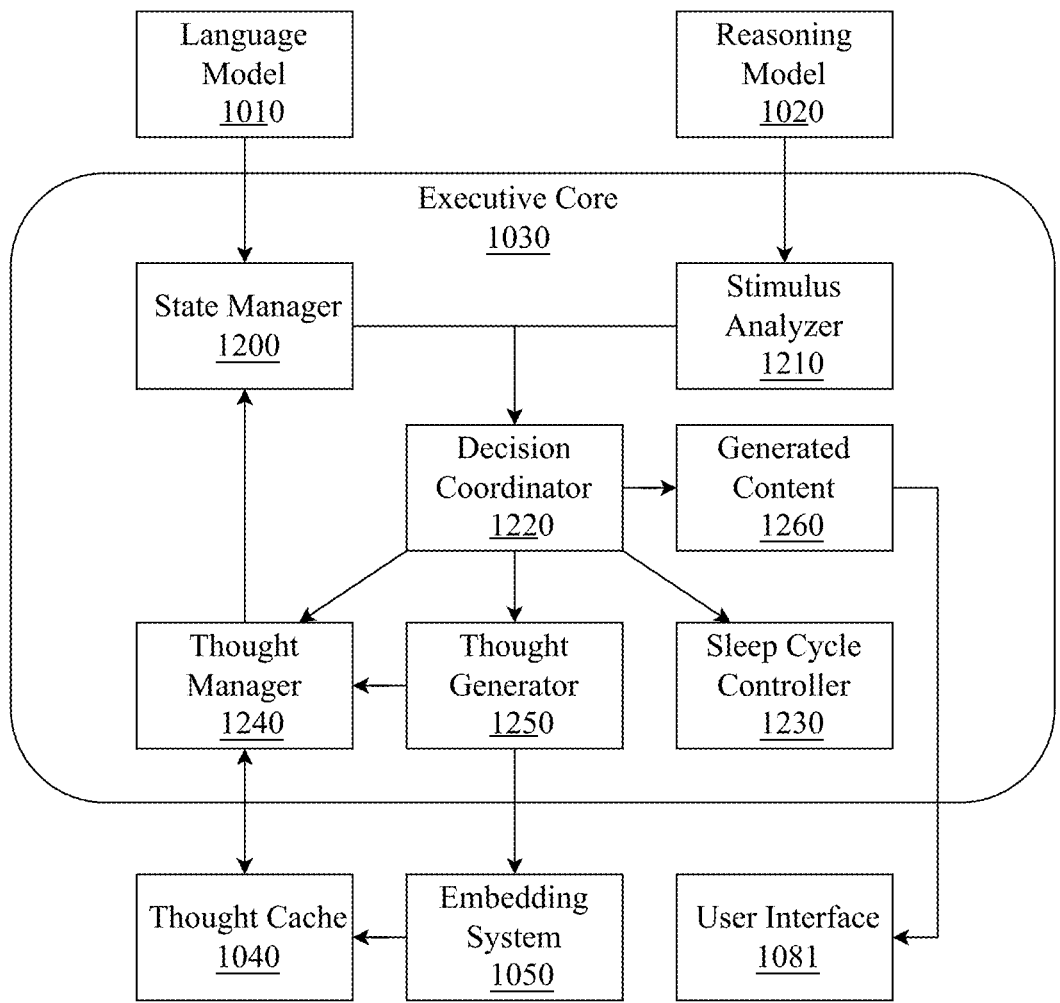
FIG. 12 is a block diagram illustrating the detailed architecture of the executive core and its interactions with other components of the persistent cognitive machine platform.

FIG. 12 is a block diagram illustrating the detailed architecture of the executive core and its interactions with other components of the persistent cognitive machine platform. Executive core 1030 serves as the central orchestration component of the persistent cognitive machine platform 1000, coordinating the activities of all other components and managing the overall cognitive processes of the system. Unlike the control systems in traditional AI architectures, executive core 1030 maintains continuous cognitive processes and makes decisions about how to allocate resources, process information, and manage the system's thoughts.

At the top level, executive core 1030 interfaces with language model 1010 and reasoning model 1020, leveraging these components to process language and perform reasoning tasks respectively. Executive core 1030 determines when to engage each of these models based on the nature of the current cognitive task, coordinating their operations to achieve coherent and effective cognitive processing.

A state manager 1200 within the executive core is responsible for tracking and controlling the operational state of the persistent cognitive machine. State manager 1200 maintains awareness of whether the system is in an active interaction state, passive observation state, independent thinking state, or sleep state. State manager 1200 monitors transitions between these states and ensures appropriate resource allocation and behavior patterns for each state. By maintaining this state awareness, state manager 1200 enables the persistent cognitive machine to exhibit different behaviors appropriate to different operational contexts.

Working in coordination with state manager 1200 is a stimulus analyzer 1210, which processes and evaluates incoming stimuli from both external and internal sources. When the system receives input via user interface 1081 or other input channels, stimulus analyzer 1210 examines this input to determine its nature, relevance, and appropriate response pathway. Stimulus analyzer 1210 may perform tasks such as intent recognition, content classification, and priority assessment to inform subsequent processing decisions. Stimulus analyzer 1210 also processes internal stimuli generated by the system's own cognitive processes, enabling responses to the system's own thoughts.

A decision coordinator 1220 serves as the central decision-making component within the executive core. Based on input from state manager 1200 and stimulus analyzer 1210, the decision coordinator 1220 determines appropriate actions and resource allocations. Decision coordinator 1220 orchestrates the flow of information between different system components, decides when to retrieve information from thought cache 1040, when to generate new thoughts, and when to produce external responses. Decision coordinator 1220 implements sophisticated decision strategies that balance immediate response needs with longer-term cognitive goals.

The persistent cognitive machine is capable of improving the models and thoughts contained within the platform through the implementation of a sleep cycle controller 1230, which manages the system's sleep states. Sleep cycle controller 1230 determines when the system should enter sleep states based on factors such as activity levels, resource utilization, and accumulated need for thought curation. During sleep states, this component orchestrates the internal processes that occur, including memory consolidation, thought generalization, and pattern extraction. The sleep cycle controller 1230 also monitors for wake triggers that would necessitate an early exit from the sleep state, ensuring that stimuli can interrupt sleep when necessary.

A thought manager 1240 handles the curation, retrieval, and storage of thoughts within the system. This component interfaces with thought cache 1040 to store new thoughts generated during cognitive processes and to retrieve relevant thoughts based on current context and stimuli. Thought manager 1240 implements retrieval strategies that may consider direct relevance, analogical relationships, temporal context, and other factors that might make certain thoughts useful in the current context. By effectively managing the system's accumulated thoughts, this component enables the persistent cognitive machine to leverage its experiences when responding to new situations. Working alongside the thought manager, a thought generator 1250 creates new thoughts based on current cognitive processes. Unlike the more reactive processing in traditional AI systems, thought generator 1250 can initiate new thoughts autonomously, triggered by internal processes rather than external inputs. Thought generator 1250 can create associations between previously unconnected thoughts, generate hypotheses, form questions, or produce other types of thoughts that contribute to the system's cognitive processes. The thought generator 1250 is central to the system's ability to think independently rather than merely responding to prompts.

The output of the executive core's processing is channeled through the remaining systems as generated content 1260. The generated content 1260 may interface with user interface 1081 to present information to human users or with other interface components to communicate with external systems.

Executive core 1030 maintains bidirectional connections with thought cache 1040, enabling the storage and retrieval of thoughts. This connection aids in the system's ability to maintain persistent cognition, as it allows experiences and insights to be preserved and leveraged across interactions. Thought cache 1040 stores not just factual information but also associations, patterns, and other forms of thought that constitute the system's accumulated cognitive experience. Supporting the thought storage and retrieval processes is embedding system 1050, which converts thoughts into vector representations in a high-dimensional abstract space. This system enables thoughts to be organized based on semantic similarity rather than simple keyword matching, allowing for more robust retrieval based on conceptual relationships. Embedding system 1050 works with both thought manager 1240 and thought cache 1040 to facilitate effective thought organization and retrieval.

User interface 1081 provides the means for external entities to interact with the persistent cognitive machine. This component handles both input reception and output presentation, enabling two-way communication between the system and its users. User interface 1081 may implement various modalities of interaction depending on the specific application context.

In operation, executive core 1030 continuously manages the cognitive processes of the persistent cognitive machine, whether actively engaged with external entities or operating independently. When external stimuli are received via user interface 1081, stimulus analyzer 1210 processes this input and feeds information to decision coordinator 1220. Decision coordinator 320 then determines appropriate actions, potentially engaging language model 1010 and reasoning model 1020 while instructing thought manager 1240 to retrieve relevant thoughts from the thought cache 1040. Based on this processing, the system may generate new thoughts via thought generator 1250, which are then stored in thought cache 1040 after being converted to vector representations by embedding system 1050. Responses or other outputs are prepared into generated content 1260 and presented via user interface 1081.

Periodically, as determined by sleep cycle controller 1230 and coordinated with state manager 1200, the system enters sleep states during which it focuses on internal cognitive maintenance rather than external interaction. The orchestration performed by executive core 1030 enables the persistent cognitive machine to transcend the limitations of traditional AI systems, maintaining continuous cognition, learning from experiences, and developing increasingly nuanced understanding over time.

Figure 13:
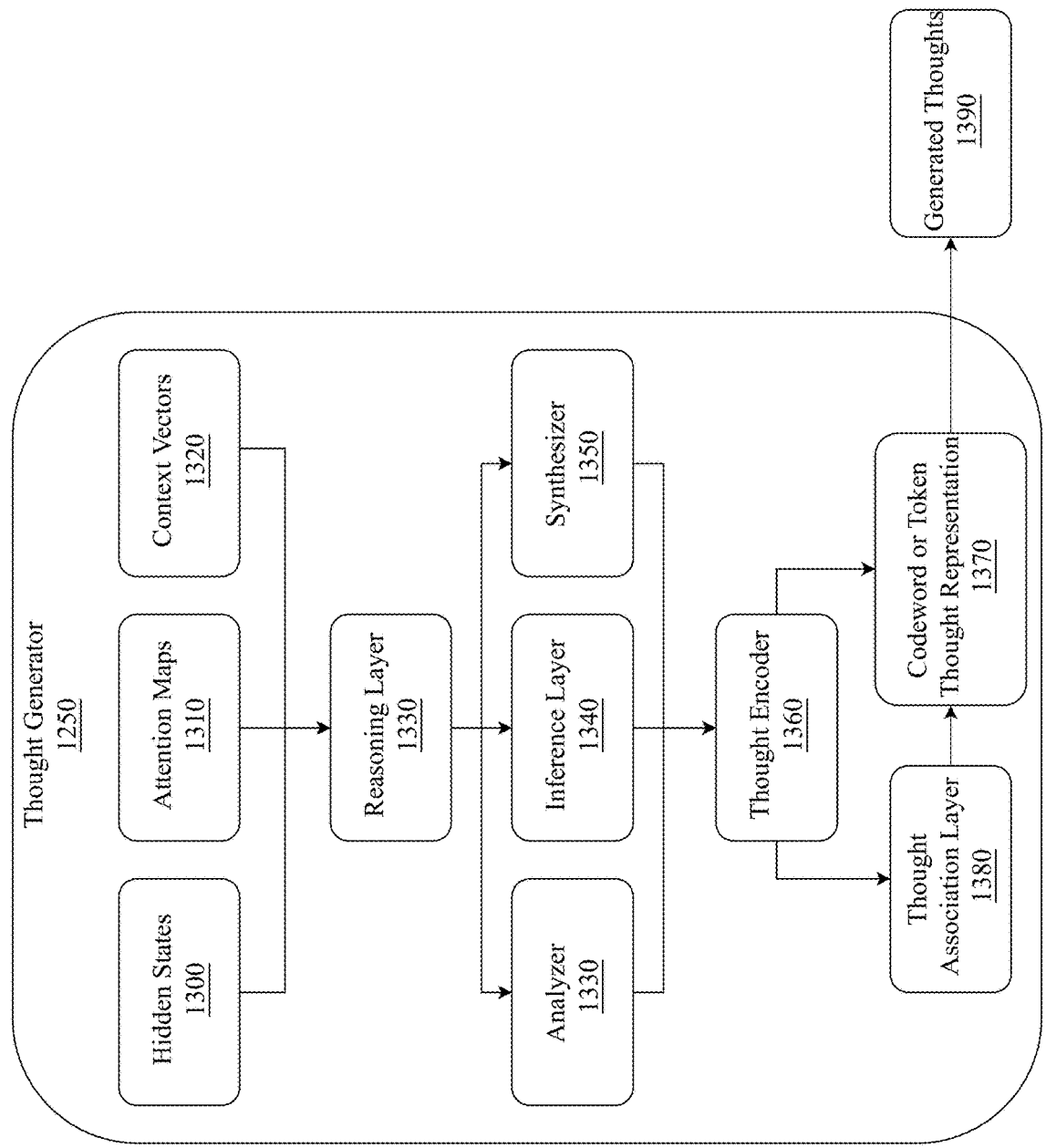
FIG. 13 is a block diagram illustrating the internal architecture of a thought generator within a Persistent Cognitive Machine.

FIG. 13 is a block diagram illustrating the internal architecture of a thought generator within a Persistent Cognitive Machine. The thought generator 1250 begins by accessing several internal representations from the language model, including hidden states 1300, attention maps 1310, and context vectors 1320. The hidden states 1300 capture the internal activations of the model's neural network layers, representing the model's evolving understanding of the input as it processes the sequence. Attention maps 1310 indicate which parts of the input the model is focusing on at different stages of processing, providing insights into the model's attentional patterns and focus. Context vectors 1320 aggregate information from different parts of the sequence, representing the contextual understanding that the model has built.

These internal representations are fed into a reasoning layer 1330, which serves as the central component for extracting coherent reasoning patterns from the model's internal states. The reasoning layer 1330 processes these inputs to identify distinct reasoning steps and analysis patterns that constitute the model's thinking process.

The output from the reasoning layer 1330 is then distributed to three specialized processing components: an analyzer 1330, an inference layer 1340, and a synthesizer 1350. The analyzer 1330 examines the input prompt and the model's initial understanding, identifying key concepts, constraints, and requirements. The inference layer 1340 performs logical reasoning and deduction based on the model's knowledge and the analyzed information. The synthesizer 1350 combines different pieces of analysis and inference to form coherent, integrated conclusions or responses.

The outputs from these three components are then passed to a thought encoder 1360, which formats the reasoning steps into structured thought representations. The thought encoder 1360 processes the raw reasoning outputs and transforms them into a standardized format suitable for representation as tokens.

The encoded thoughts are then processed through two parallel pathways. First, they are passed to a thought association layer 1380 that explicitly links each thought to relevant portions of the input prompt, establishing the relationship between thoughts and the context that triggered them. Second, they are converted into a codeword or token thought representation 1370, which represents each thought using the system's codeword vocabulary, allowing for compact storage and efficient processing.

The final output of the thought generator 1250 is a collection of generated thoughts 1310, each represented as a sequence of tokens that capture a discrete unit of reasoning or analysis. These thoughts are structured representations of the model's intermediate reasoning processes, explicitly capturing the step-by-step thinking that the model performs while processing the input.

Figure 14:
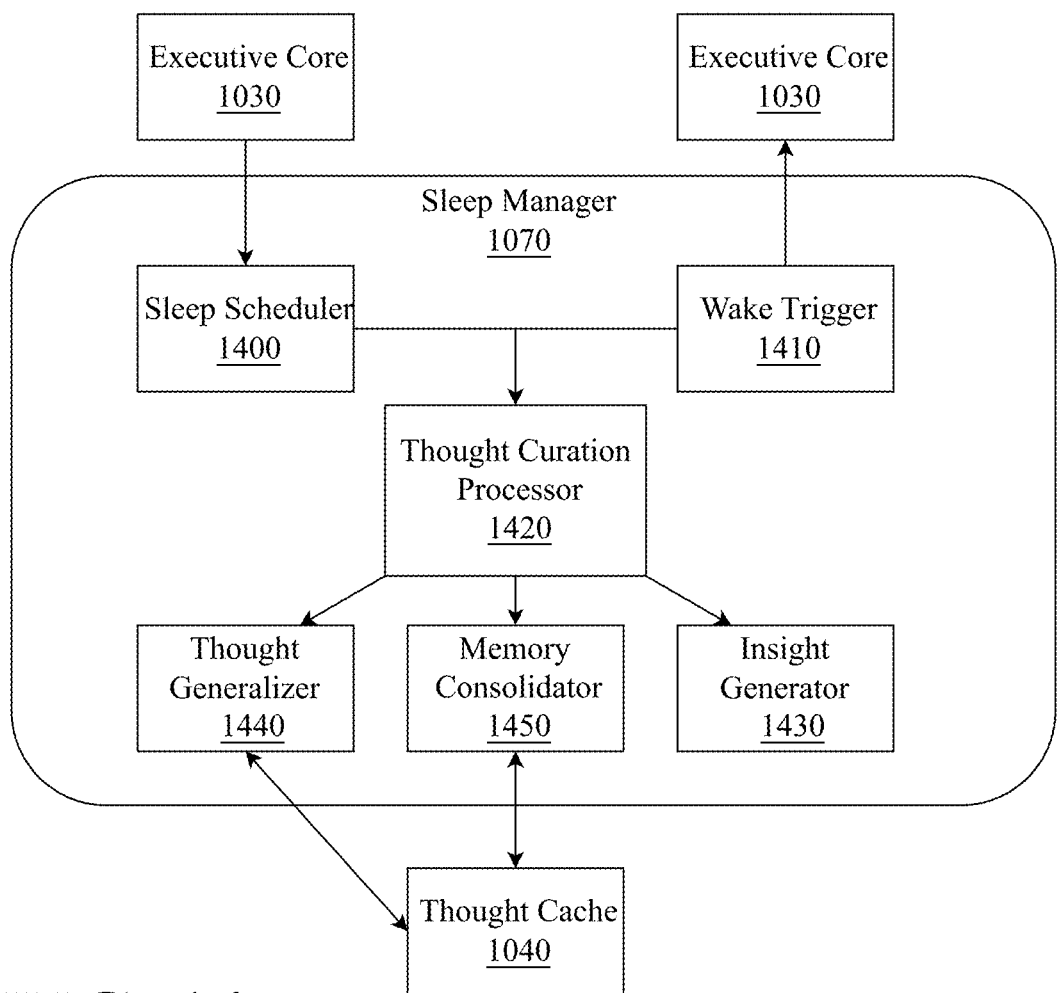
FIG. 14 is a block diagram illustrating an exemplary architecture of a component within a Persistent Cognitive Machine, a sleep manager.

FIG. 14 is a block diagram illustrating an exemplary architecture of a component within a Persistent Cognitive Machine, a sleep manager. Sleep manager 1070 allows the PCM to enter sleep-like states during which the system performs internal cognitive maintenance processes rather than responding to external stimuli. This component draws inspiration from biological sleep processes but adapts these concepts specifically for the needs of an artificial cognitive system. Sleep manager 1070 interfaces with executive core 1030 in a bidirectional manner. Executive core 1030 provides inputs regarding system state and activity levels, while sleep manager 1070 reports back on sleep state transitions and outcomes of sleep processes. This relationship ensures that sleep states are integrated with the overall cognitive processing of the platform rather than operating as an isolated subsystem.

Within sleep manager 1070, a sleep scheduler 1400 determines when the persistent cognitive machine should enter sleep states. This component monitors various factors such as recent activity levels, time elapsed since the last sleep cycle, accumulated cognitive load, and current external interaction demands. Based on these factors, sleep scheduler 1400 makes decisions about the timing and duration of sleep cycles. Sleep scheduler 1400 may implement different types of sleep cycles with varying depths and durations, each optimized for different types of cognitive maintenance tasks.

Complementing sleep scheduler 1400 is a wake trigger 1410, which monitors conditions that would necessitate an early exit from a sleep state. While the persistent cognitive machine is designed to be temporarily unresponsive during sleep states, certain high-priority stimuli must be able to interrupt sleep when necessary. Wake trigger 1410 continuously evaluates incoming stimuli against wake criteria, determining whether the stimulus is important enough to warrant interrupting the current sleep cycle. This component ensures that the system remains responsive to critical needs even during sleep states.

At the heart of the sleep manager is a thought curation processor 1420, which orchestrates the various cognitive maintenance processes that occur during sleep states. This central component coordinates the activities of specialized processors that handle different aspects of thought curation. Thought curation processor 1420 determines which maintenance processes to prioritize during a given sleep cycle, allocates resources between different processes, and tracks the progress and outcomes of these processes. One of the processes that occurs during sleep states is performed by insight generator 1430, which creates new connections between previously unrelated thoughts. This component analyzes patterns across the system's accumulated thoughts to identify non-obvious relationships, potential implications, and novel perspectives. Insight generator 1430 enables the persistent cognitive machine to develop new understanding that goes beyond what was explicitly learned from experiences, allowing it to make creative leaps and generate innovative solutions to problems.

Working in parallel with insight generator 1430, thought generalizer 1440 identifies patterns across specific experiences to create more broadly applicable concepts. When the persistent cognitive machine encounters multiple similar situations, thought generalizer 1440 extracts the common elements to form generalized knowledge that can be applied to new situations. This process is similar to abstraction in human cognition, where specific instances lead to the formation of general principles. Thought generalizer 1440 enables the system to become more efficient in its cognitive processes by recognizing patterns rather than treating each new experience as entirely novel.

A memory consolidator 1450 strengthens important connections and integrates new experiences with existing knowledge. This component evaluates recent experiences based on factors such as emotional significance, relevance to ongoing goals, repetition, and novelty to determine which experiences should be consolidated into long-term memory. Memory consolidator 1450 also strengthens connections between related thoughts based on co-activation patterns, enhancing the system's ability to retrieve relevant information in the future. Through these processes, memory consolidator 1450 ensures that important experiences are preserved while less significant details may fade from accessibility over time.

All of these sleep processes interact with thought cache 1040, which stores the persistent cognitive machine's accumulated thoughts and experiences. During sleep states, thought cache 1040 provides the raw material for curation processes and receives the updated thought structures that result from these processes. The bidirectional connection between sleep manager 1070 and thought cache 1040 enables the system to effectively organize and utilize its accumulated experiences.

In operation, sleep manager 1070 receives signals from executive core 1030 indicating that conditions are appropriate for a sleep cycle. Sleep scheduler 1400 then initiates a sleep state, during which thought curation processor 1420 activates insight generator 1430, thought generalizer 1440, and memory consolidator 1450 to perform their respective functions on the contents of thought cache 1040. Throughout this process, wake trigger 1410 monitors for conditions that would necessitate an early return to an active state. The sleep processes implemented by sleep manager 1070 are aid in the persistent cognitive machine's ability to learn effectively from experiences over time. By curating thoughts during periods of reduced external interaction, the system can develop more sophisticated understanding and more efficient cognitive processes. This approach mirrors the importance of sleep for learning and memory consolidation in biological systems while being specifically designed for the unique requirements of an artificial cognitive architecture.

Sleep manager 1070 embodies a fundamental advancement beyond traditional AI systems, which typically process information only in response to explicit prompts and lack dedicated mechanisms for organizing and generalizing from accumulated experiences. By implementing these biologically-inspired but technologically-adapted processes, the persistent cognitive machine platform achieves a level of cognitive sophistication and adaptability that would be difficult or impossible to attain through prompt-response processing alone.

Figure 15:
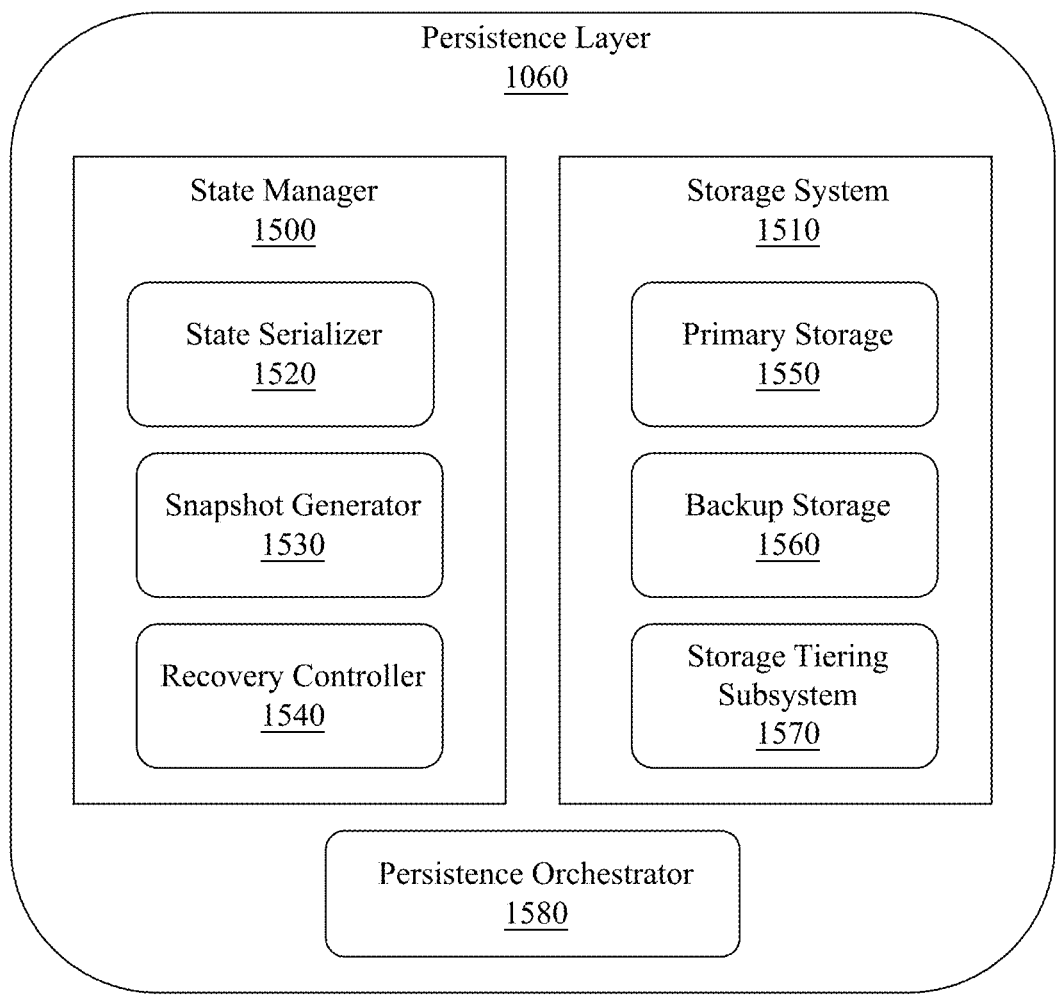
FIG. 15 is a block diagram illustrating an exemplary architecture of a component within a Persistent Cognitive Machine, a persistence layer.

FIG. 15 is a block diagram illustrating an exemplary architecture of a component within a Persistent Cognitive Machine, a persistence layer. The persistence layer 1060 enables the persistent cognitive machine to maintain continuity of cognition across system shutdowns and restarts. Unlike traditional AI systems that reset to an initial state when restarted, the persistent cognitive machine preserves its accumulated experiences, relationships, and cognitive state, allowing it to resume operation as if no interruption had occurred. This capability is instrumental to the "persistent" aspect of the system's design.

Persistence layer 1060 is organized into two main subsystems-a state manager 1500 and a storage system 1510—with a persistence orchestrator 1580 coordinating between them. This architecture ensures reliable state preservation while optimizing for both performance and data integrity. State manager 1500 handles the processing and organization of system state information for persistence. This component determines what aspects of the system state need to be preserved, how frequently different types of state should be saved, and how to structure the state data for efficient storage and retrieval. State manager 1500 works closely with other components of the persistent cognitive machine to ensure that all critical state information is captured appropriately.

Within state manager 1500, a state serializer 1520 converts the runtime objects and data structures of the persistent cognitive machine into formats suitable for storage. This component handles the complex task of transforming the rich, interconnected thought structures and system configurations into serialized representations that can be efficiently stored while preserving all necessary relationships and metadata. State serializer 1520 may employ various serialization strategies optimized for different types of state information, balancing factors such as storage efficiency, serialization speed, and deserialization performance.

Working alongside state serializer 1520, a snapshot generator 1530 creates consistent point-in-time snapshots of the system state. Rather than continuously updating state information, which could lead to inconsistencies if the system were to shut down unexpectedly, snapshot generator 1530 creates complete snapshots at appropriate intervals. These snapshots serve as recovery points to which the system can return if needed. The snapshot generator 1530 may implement various snapshot strategies, including full snapshots and incremental snapshots, to balance storage efficiency and recovery capabilities.

Complementing these components is a recovery controller 1540, which manages the restoration of system state after a shutdown or failure. When the persistent cognitive machine restarts, recovery controller 1540 coordinates the process of loading the most recent valid snapshot and applying any necessary transformations to restore the system to its previous state. This component includes validation mechanisms to ensure that corrupted or incomplete state data does not compromise the system's operation. Recovery controller 1540 may also implement strategies for partial recovery in cases where complete state restoration is not possible.

A storage system 1510 provides the physical storage capabilities needed to persist system state across shutdowns. This component manages the actual storage and retrieval of serialized state data, implementing appropriate mechanisms for data integrity, efficiency, and reliability. Storage system 1510 may interface with various types of storage hardware depending on the deployment environment of the persistent cognitive machine. Within storage system 1510, a primary storage 1550 provides the main storage facility for system state. This component is optimized for performance and accessibility, enabling rapid storage and retrieval of state information during normal operation. Primary storage 1550 may utilize high-performance storage technologies such as solid-state drives or in-memory databases to minimize the performance impact of state persistence operations.

To protect against data loss, a backup storage 1560 maintains redundant copies of critical state information. This component may implement various backup strategies, including off-site replication, to ensure that state information can be recovered even in the event of hardware failures or other disasters. Backup storage 1560 works in coordination with the primary storage 1550 to provide a comprehensive data protection strategy. A storage tiering subsystem 1570 optimizes storage usage by placing different types of state information on appropriate storage tiers. Storage tiering subsystem 1570 recognizes that not all state information has the same access patterns or recovery requirements. Frequently accessed or important state information may be stored on high-performance storage tiers, while less frequently accessed historical information may be moved to more cost-effective storage tiers. Storage tiering subsystem 1570 implements policies for data migration between tiers based on access patterns and aging criteria.

Coordinating the activities of both state manager 1500 and storage system 1510 is a persistence orchestrator 1580. This central component ensures that state serialization, snapshot generation, storage operations, and recovery processes work together seamlessly. Persistence orchestrator 1580 implements policies for when to create snapshots, how to balance system performance with persistence requirements, and how to handle exceptional conditions. This component provides a unified interface for other parts of the persistent cognitive machine to interact with the persistence capabilities.

In operation, persistence layer 1060 continuously monitors the state of the persistent cognitive machine and periodically creates serialized snapshots through state serializer 1520 and snapshot generator 1530. These snapshots are stored in primary storage 1550, with redundant copies maintained in backup storage 1560 and potentially migrated between storage tiers by storage tiering subsystem 1570 based on aging and access patterns. When the system restarts after a shutdown, recovery controller 1540 retrieves the most recent valid snapshot and restores the system state, allowing the persistent cognitive machine to resume operation from where it left off.

Persistence layer 1060 is helpful to the concept of persistent cognition, allowing the system to accumulate experiences and knowledge over extended periods that may span multiple operational sessions. The persistence mechanisms implemented in this layer enable the persistent cognitive machine to maintain continuity of cognition despite the practical necessity of occasional system shutdowns. The architecture of persistence layer 1060 is designed to be adaptable to various deployment environments, from single-server installations to distributed cloud environments. The modular approach allows for different implementations of the storage components based on available technologies and specific requirements, while maintaining consistent behavior from the perspective of the rest of the persistent cognitive machine platform.

Figure 16:
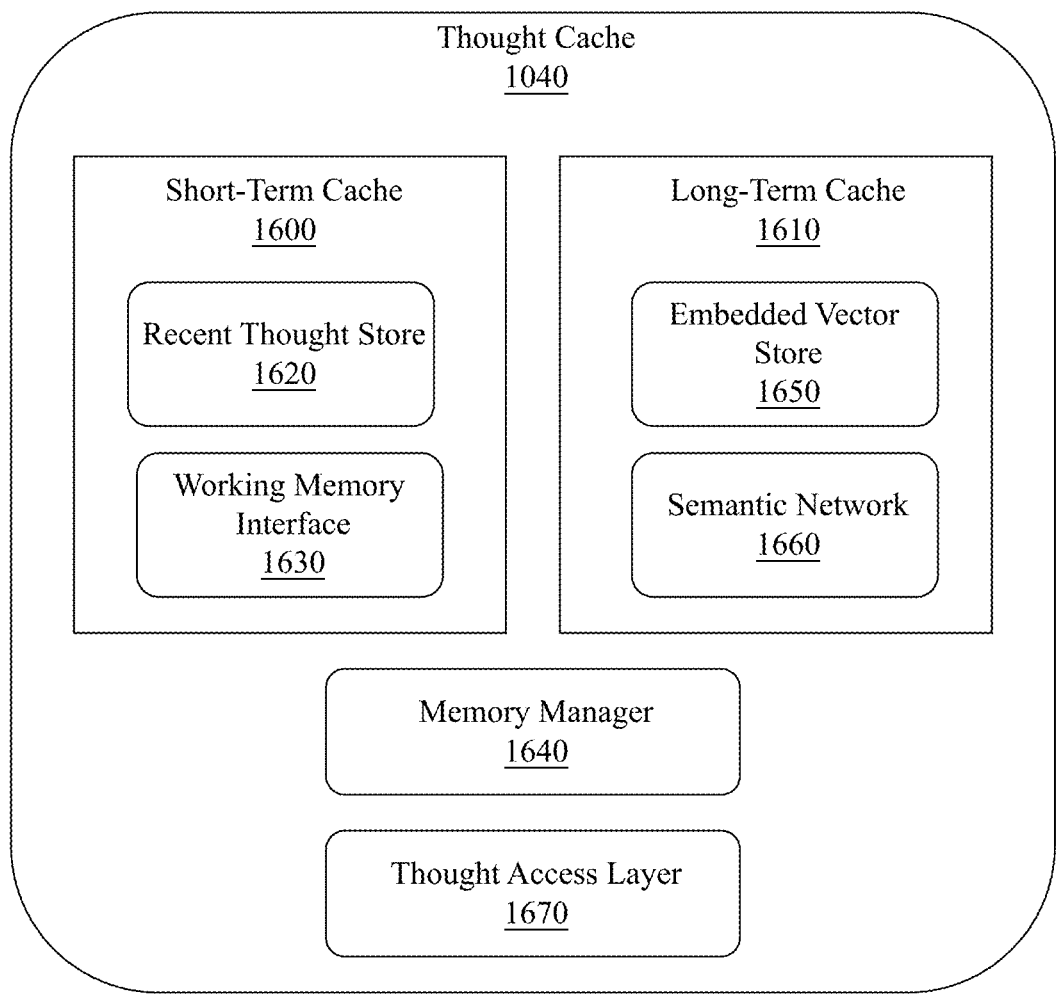
FIG. 16 is a block diagram illustrating an exemplary architecture of a component within a Persistent Cognitive Machine, a thought cache.

FIG. 16 is a block diagram illustrating an exemplary architecture of a component within a Persistent Cognitive Machine, a thought cache. Thought cache 1040 functions as the system's memory and enabling it to remember previous experiences and apply them to new situations. Unlike traditional AI systems that typically rely on fixed knowledge representations or simple retrieval mechanisms, thought cache 1040 implements a sophisticated, biologically-inspired memory architecture that supports both short-term and long-term memory functions with mechanisms for transferring information between them.

Thought cache 1040 is organized into two primary components: a short-term cache 1600 and a long-term cache 1610. This division mirrors biological memory systems, allowing for different optimization strategies appropriate to the different functions and characteristics of short-term versus long-term memory storage.

Short-term cache 1600 stores recently encountered or generated thoughts that are actively being used in current cognitive processes. This component provides high-speed access to thoughts that are relevant to ongoing operations, enabling the persistent cognitive machine to maintain context and continuity during interactions and cognitive processes. Short-term cache 700 has limited capacity compared to the long-term cache, focusing on thoughts that are immediately relevant rather than attempting to store the system's entire cognitive history.

Within short-term cache 1600, recent thought store 1620 maintains the most recently created or accessed thoughts. This component functions similar to working memory in humans, keeping active thoughts readily available for immediate processing. Recent thought store 1620 organizes thoughts based on recency and relevance to current cognitive processes, enabling rapid access to contextually appropriate information. Thoughts in this store may be temporarily held even when not immediately active to support context maintenance across related cognitive processes.

Complementing the recent thought store, a working memory interface 1630 provides mechanisms for the executive core and other components to interact with the contents of the short-term cache. This interface enables operations such as thought retrieval, manipulation, and temporary storage during active cognitive processes. Working memory interface 1630 implements priority schemes that determine which thoughts remain in working memory and which are transferred to long-term storage or discarded, based on factors such as relevance, importance, and cognitive load.

For longer-term storage of thoughts, long-term cache 1610 maintains a comprehensive repository of the system's accumulated experiences and derived knowledge. This component stores thoughts that have been deemed significant enough to preserve beyond their immediate context, enabling the persistent cognitive machine to develop a continuously growing knowledge base from which it can draw in future operations. Long-term cache 1610 implements sophisticated storage and retrieval mechanisms that optimize for capacity and organization rather than raw access speed.

Within a long-term cache 1610, an embedded vector store 1650 represents thoughts as vectors in a high-dimensional abstract space. This component leverages techniques similar to those used in modern vector databases, enabling efficient storage and similarity-based retrieval of large volumes of thought data. By representing thoughts as vectors, embedded vector store 1650 allows for retrieval based on semantic similarity rather than exact matching, supporting more flexible and human-like memory access patterns. Thoughts that are conceptually similar are positioned closer together in this abstract space, facilitating associative retrieval processes.

Complementing the vector-based representation, a semantic network 1660 maintains explicit relationships between thoughts. While the embedded vector store captures implicit similarity, semantic network 1660 represents specific relationships such as causality, hierarchy, temporal sequence, and other structured associations between thoughts. This component enables the system to traverse these relationships during reasoning processes, supporting capabilities such as logical inference, narrative understanding, and structured knowledge representation. Semantic network 1660 grows and evolves over time as the system encounters new information and develops new connections between existing thoughts.

Coordinating between these storage components is a memory manager 1640, which oversees the movement of thoughts between short-term and long-term storage. This component implements policies for when thoughts should be transferred from short-term to long-term memory, how thoughts in long-term memory should be organized and indexed, and when thoughts should be retrieved from long-term memory based on their relevance to current cognitive processes. Memory manager 1640 may use factors such as thought importance, repetition, emotional significance, and relevance to ongoing goals to determine which thoughts deserve long-term preservation and how they should be prioritized.

Providing unified access to the thought cache's capabilities is a thought access layer 1670, which serves as the interface through which other components of the persistent cognitive machine interact with stored thoughts. This component implements query mechanisms that allow for thought retrieval based on various criteria, including content similarity, temporal relationships, categorical membership, and explicit associations. Thought access layer 1670 abstracts away the underlying storage mechanisms, presenting a consistent interface regardless of whether thoughts are retrieved from short-term or long-term storage. This layer may also implement access control mechanisms to ensure appropriate use of thought data when such considerations are relevant.

In operation, thought cache 1040 continuously receives new thoughts generated during the persistent cognitive machine's cognitive processes. These thoughts are initially stored in recent thought store 1620 within short-term cache 1600, where they are readily available for ongoing processing. As the system continues to operate, memory manager 1640 evaluates these thoughts to determine which should be preserved in long-term memory. Thoughts selected for long-term preservation are processed by the embedding system to create vector representations, which are then stored in embedded vector store 1650. Relationships between these thoughts and existing knowledge are recorded in semantic network 1660.

When the persistent cognitive machine encounters new situations, thought access layer 1670 retrieves relevant thoughts from both short-term and long-term storage based on similarity to the current context, explicit relationships, and other retrieval criteria. These retrieved thoughts then inform the system's response to the current situation, allowing it to leverage past experiences and accumulated knowledge rather than responding based solely on immediate input.

Thought cache 1040 is aids in the persistent cognitive machine's ability to develop increasingly sophisticated understanding over time. By preserving thoughts across interactions and even across system restarts (in conjunction with the persistence layer), the thought cache enables continuous learning and adaptation. This capability represents a fundamental advancement beyond traditional AI systems, which typically either maintain static knowledge representations or learn incrementally through explicit training processes rather than naturally accumulating experiences.

Figure 17:
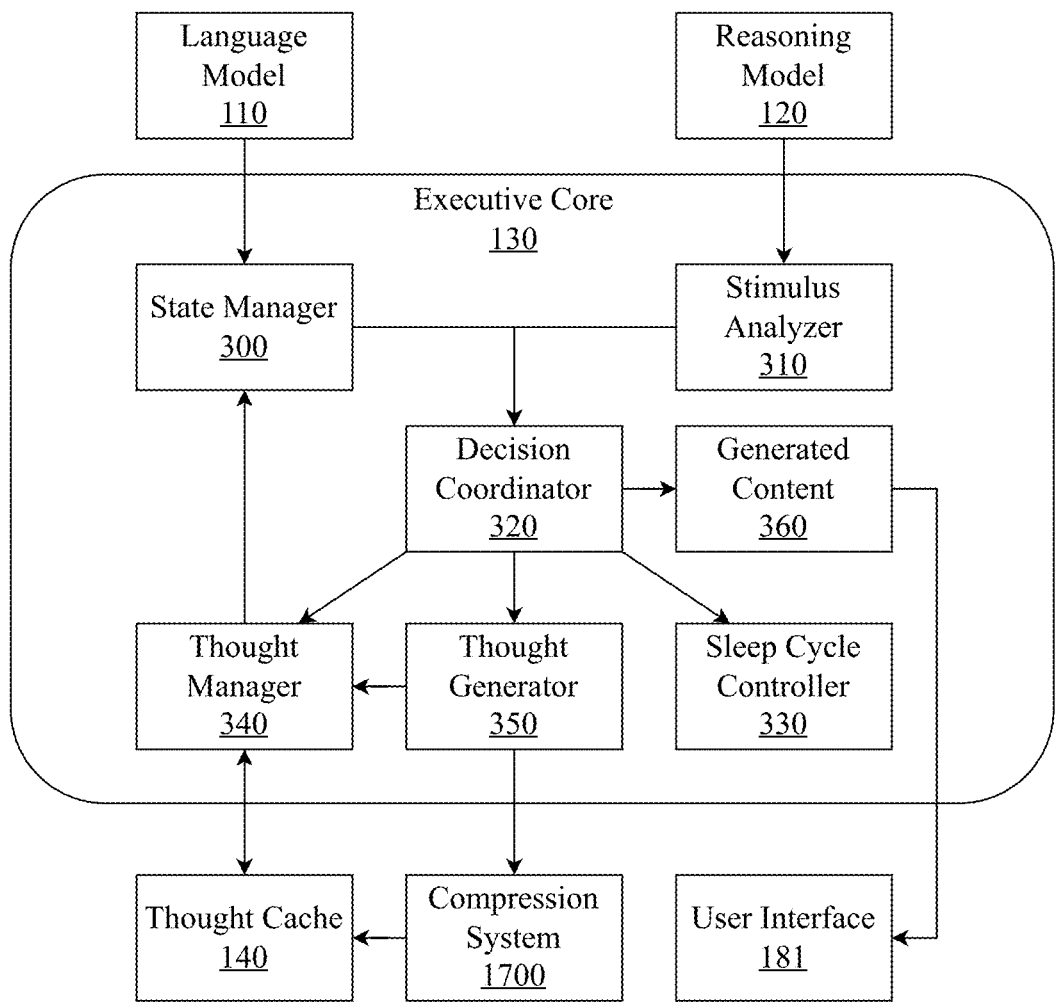
FIG. 17 is a block diagram illustrating an exemplary architecture of an executive core integrated with a compression system within a persistent cognitive machine platform.

FIG. 17 is a block diagram illustrating an exemplary architecture of an executive core integrated with a compression system within a persistent cognitive machine platform. Executive core 130 serves as the central orchestration component of the persistent cognitive machine, coordinating the activities of all other components and managing the overall cognitive processes of the system. Unlike control systems in traditional AI architectures, executive core 130 maintains continuous cognitive processes and makes decisions about how to allocate resources, process information, and manage the system's thoughts.

At the top level, executive core 130 interfaces with language model 110 and reasoning model 120, leveraging these components to process language and perform reasoning tasks respectively. The executive core determines when to engage each of these models based on the nature of the current cognitive task and coordinates their operations to achieve coherent cognitive processing.

Within the executive core, a state manager 300 tracks and controls the operational state of the persistent cognitive machine, maintaining awareness of whether the system is in an active interaction state, passive observation state, independent thinking state, or sleep state. State manager 300 monitors transitions between these states and ensures appropriate resource allocation for each state. This state awareness is particularly important when coordinating with the compression system 1700, as different operational states may require different compression strategies and priorities.

A stimulus analyzer 310 processes and evaluates incoming stimuli from both external and internal sources. When the system receives input via user interface 181, stimulus analyzer 310 examines this input to determine its nature, relevance, and appropriate response pathway. The stimulus analyzer also processes internal stimuli, enabling responses to the system's own thoughts. When processing stimuli that may require access to previously compressed thoughts, stimulus analyzer 310 communicates with compression system 1700 to request decompression of relevant thought vectors.

A decision coordinator 320 serves as the central decision-making component within the executive core. Based on input from state manager 300 and stimulus analyzer 310, decision coordinator 320 determines appropriate actions and resource allocations. Decision coordinator 320 orchestrates the flow of information between different system components, decides when to retrieve information from thought cache 140, when to generate new thoughts, and when to produce external responses. When handling large volumes of thought data, decision coordinator 320 may request compression services from compression system 1700 to optimize resource utilization during complex cognitive tasks The executive core includes a sleep cycle controller 330 that manages the system's sleep states. Sleep cycle controller 330 determines when the system should enter sleep states based on factors such as activity levels, resource utilization, and accumulated need for thought curation. During sleep states, compression system 1700 performs batch compression operations on accumulated thoughts, taking advantage of reduced external interaction demands to optimize memory organization. The sleep cycle controller coordinates with compression system 1700 to ensure that compression operations do not interfere with critical sleep-state activities such as memory consolidation and insight generation.

A thought manager 340 handles the curation, retrieval, and storage of thoughts within the system. This component interfaces with thought cache 140 to store new thoughts generated during cognitive processes and to retrieve relevant thoughts based on current context and stimuli. Thought manager 340 works closely with compression system 1700 to determine which thoughts should be compressed, when compression should occur, and what compression strategies should be applied. For example, thoughts that are frequently accessed might receive lighter compression for rapid availability, while less frequently accessed thoughts may undergo more intensive compression to optimize storage.

Working alongside the thought manager, a thought generator 350 creates new thoughts based on current cognitive processes. Thought generator 350 can initiate new thoughts autonomously, triggered by internal processes rather than external inputs. As new thoughts are generated, they are evaluated for compression potential by compression system 1700. Certain types of thoughts, such as those containing multiple related concepts or complex semantic structures, may benefit from specialized compression techniques that preserve semantic relationships while reducing storage requirements.

A key innovation in this integrated architecture is compression system 1700, which implements the federated two-stage compression with federated joint learning described in previous figures. Compression system 1700 processes thoughts as they flow between the executive core and thought cache 140, providing efficient compression and decompression services tailored to the specific characteristics of thought vectors. Unlike traditional data compression systems, compression system 1700 is specifically optimized for the high-dimensional vector representations used in the persistent cognitive machine.

Compression system 1700 comprises the full architecture described in FIG. 1, including an embedding system for processing input data, a long short-term memory system, a multilayer perceptron system, a SoftMax function, and an arithmetic encoder. However, when integrated with the persistent cognitive machine, these components are specially configured to process thought vectors rather than generic data. For example, the embedding system is tuned to preserve semantic relationships between thoughts during compression, while the LSTM and MLP components are trained on thought pattern datasets to optimize compression for cognitive structures.

In operation, when thought generator 350 creates a new thought, the thought is first represented as a high-dimensional vector in the persistent cognitive machine's internal abstract space. This thought vector is then passed to compression system 1700, which analyzes the vector to identify optimal compression strategies. The compression process begins by encoding the thought vector through the embedding system, which prepares it for further processing by the neural network components.

The embedded thought vector is then processed by the long short-term memory system, which captures temporal dependencies and contextual relationships within the thought structure. This is particularly important for complex thoughts that contain multiple related concepts or sequential reasoning steps. The LSTM's ability to maintain context through its gating mechanisms helps preserve the cognitive integrity of the thought during compression.

After LSTM processing, the multilayer perceptron system applies a PAQ algorithm optimized for thought vector compression. This produces a neural network output that represents the thought in a more compact form. The SoftMax function then generates a compressed thought representation, which is further processed by the arithmetic encoder to produce the final compressed thought.

The compressed thought is stored in thought cache 140, along with metadata that facilitates future retrieval. This metadata includes information about semantic relationships, temporal context, and compression parameters used. When the compressed thought needs to be retrieved, compression system 1700 performs the decompression process, reconstructing the original thought vector with minimal information loss.

A unique aspect of this integration is the federated learning capability of compression system 1700. As the persistent cognitive machine accumulates experience with different types of thoughts, compression system 1700 adapts its compression strategies to optimize for the specific cognitive patterns of the individual machine. These optimized compression models can be shared across multiple persistent cognitive machine instances through the federated architecture described in previous figures, without sharing the actual thought content.

For example, a persistent cognitive machine specializing in scientific domains might
develop compression models particularly efficient at compressing thoughts related to mathematical concepts and experimental data. Through the federated learning architecture, these specialized compression capabilities could be shared with other machines, while maintaining the privacy of the specific thoughts that informed the model development.

The output of the executive core's processing, including any decompressed thoughts required for response generation, is channeled through generated content 360. The generated content 360 interfaces with user interface 181 to present information to human users or with other interface components to communicate with external systems.

In an exemplary implementation, a persistent cognitive machine processing financial analysis might generate thoughts regarding market trends based on recent data. These thoughts, represented as high-dimensional vectors, would be processed by compression system 1700 before storage in thought cache 140. When the system later encounters a query about investment strategies, thought manager 340 would identify relevant compressed thoughts, request decompression from compression system 1700, and provide the reconstructed thoughts to decision coordinator 320 for incorporation into the response.

The integration of compression system 1700 with executive core 130 enables the persistent cognitive machine to maintain significantly larger thought repositories without proportional increases in storage requirements. This is particularly valuable for long-running cognitive systems that accumulate extensive experience over time, as it allows the system to retain more of its experiential knowledge while optimizing resource utilization. The federated architecture of the compression system further enhances this capability by enabling continuous improvement of compression efficiency based on collective learning across multiple cognitive instances.

Figure 18:
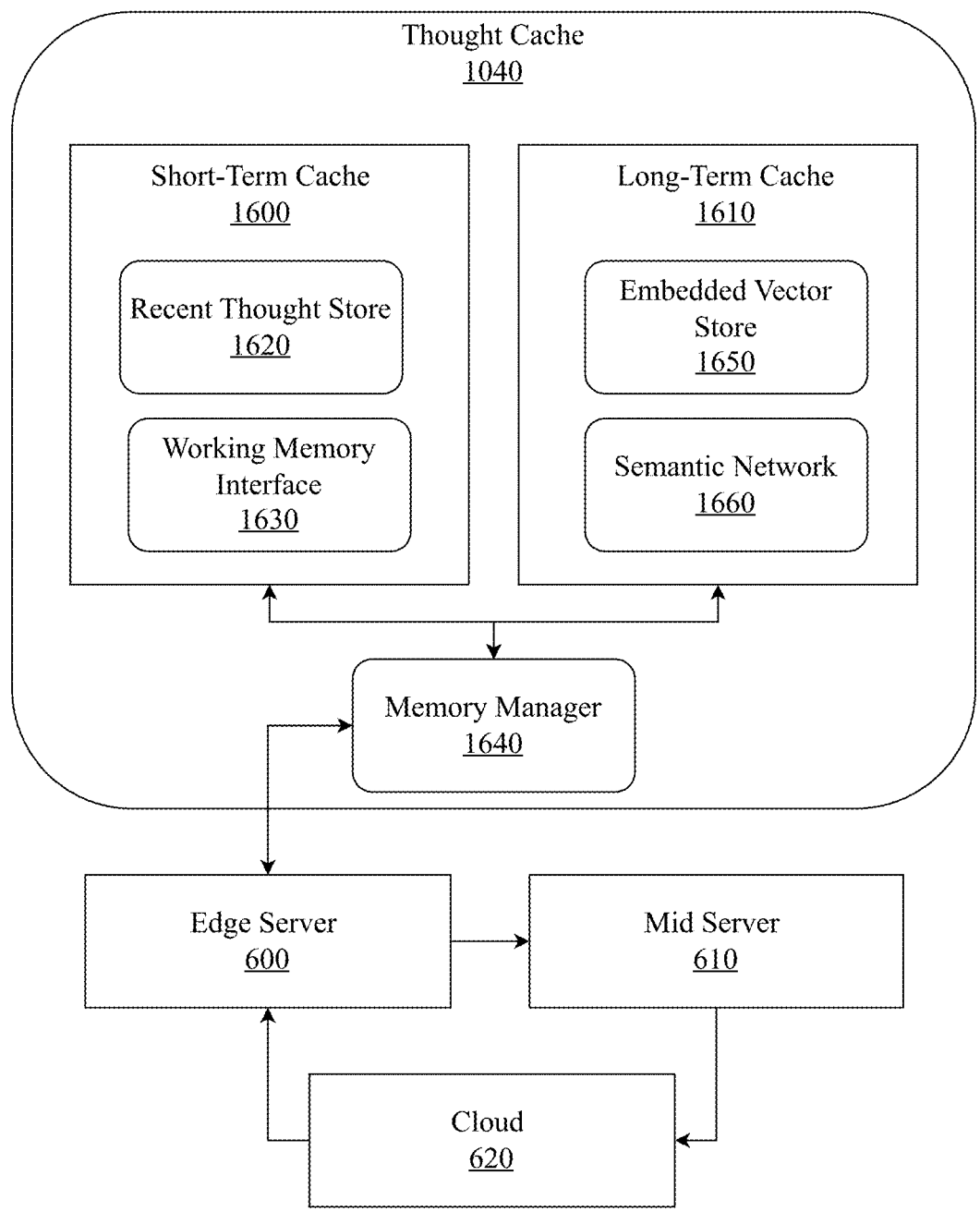
FIG. 18 is a block diagram illustrating an integrated exemplary architecture combining the thought cache of a persistent cognitive machine with a federated compression system.

FIG. 18 is a block diagram illustrating an integrated exemplary architecture combining the thought cache of a persistent cognitive machine with a federated compression system. Thought cache 1040 serves as the memory system for the persistent cognitive machine, storing thoughts that allow the system to remember past experiences and use related thoughts to engage quickly and richly with new stimuli. In this integrated architecture, the thought cache is enhanced with a federated compression infrastructure consisting of edge server 600, mid server 610, and cloud 620 components, creating a multi-tier optimization system for thought storage and retrieval. Thought cache 1040 is organized into two primary components: a short-term cache 1600 and a long-term cache 1610. This division mirrors biological memory systems, allowing for different optimization strategies appropriate to the different functions and characteristics of short-term versus long-term memory storage.

Short-term cache 1600 stores recently encountered or generated thoughts that are actively being used in current cognitive processes. This component provides high-speed access to thoughts that are relevant to ongoing operations, enabling the persistent cognitive machine to maintain context and continuity during interactions and cognitive processes. Short-term cache 1600 has limited capacity compared to the long-term cache, focusing on thoughts that are immediately relevant rather than attempting to store the system's entire cognitive history.

Within short-term cache 1600, recent thought store 1620 maintains the most recently created or accessed thoughts. This component functions similar to working memory in humans, keeping active thoughts readily available for immediate processing. Recent thought store 1620 organizes thoughts based on recency and relevance to current cognitive processes, enabling rapid access to contextually appropriate information. Due to its focus on immediate accessibility, recent thought store 1620 typically applies minimal compression to stored thoughts, prioritizing retrieval speed over storage efficiency.

Complementing the recent thought store, a working memory interface 1630 provides mechanisms for the executive core and other components to interact with the contents of the short-term cache. This interface enables operations such as thought retrieval, manipulation, and temporary storage during active cognitive processes. Working memory interface 1630 implements priority schemes that determine which thoughts remain in working memory and which are transferred to long-term storage or discarded, based on factors such as relevance, importance, and cognitive load.

For longer-term storage of thoughts, long-term cache 1610 maintains a comprehensive repository of the system's accumulated experiences and derived knowledge. This component stores thoughts that have been deemed significant enough to preserve beyond their immediate context, enabling the persistent cognitive machine to develop a continuously growing knowledge base from which it can draw in future operations. Long-term cache 1610 implements sophisticated storage and retrieval mechanisms that optimize for capacity and organization rather than raw access speed.

Within a long-term cache 1610, an embedded vector store 1650 represents thoughts as vectors in a high-dimensional abstract space. This component leverages techniques similar to those used in modern vector databases, enabling efficient storage and similarity-based retrieval of large volumes of thought data. By representing thoughts as vectors, embedded vector store 1650 allows for retrieval based on semantic similarity rather than exact matching, supporting more flexible and human-like memory access patterns. The embedded vector store is a primary target for compression optimization, as it typically contains the largest volume of stored thought data.

Complementing the vector-based representation, a semantic network 1660 maintains explicit relationships between thoughts. While the embedded vector store captures implicit similarity, semantic network 1660 represents specific relationships such as causality, hierarchy, temporal sequence, and other structured associations between thoughts. This component enables the system to traverse these relationships during reasoning processes, supporting capabilities such as logical inference, narrative understanding, and structured knowledge representation. The semantic network requires specialized compression techniques that preserve relational structures while reducing storage requirements.

Coordinating between these storage components is a memory manager 1640, which oversees the movement of thoughts between short-term and long-term storage and interfaces with the federated compression architecture. Memory manager 1640 implements policies for when thoughts should be transferred from short-term to long-term memory, how thoughts in long-term memory should be organized and indexed, and when thoughts should be retrieved from long-term memory based on their relevance to current cognitive processes. Memory manager 1640 serves as the primary integration point with the federated compression system, directing thoughts to the edge server 600 for compression processing before storage.

The edge server 600 implements the first stage of the federated compression architecture, processing thought vectors directly within the persistent cognitive machine's local environment. Edge server 600 contains a compression network that processes thought vectors to generate initial compressed representations, and a lightweight codeword model optimized specifically for the types of thoughts commonly generated by this particular cognitive machine. For example, if the persistent cognitive machine frequently processes scientific literature, the compression models on the edge server would be optimized for efficiently compressing thoughts containing scientific concepts, relationships, and reasoning patterns.

When memory manager 1640 identifies thoughts for compression, it transmits these thoughts to edge server 600. The edge server's compression network analyzes the thought vectors, identifying patterns and structures that can be efficiently compressed. The compressed thought representations are then sent to mid server 610 for further processing, while also being stored in the appropriate location within thought cache 1040. When compressed thoughts need to be retrieved, memory manager 1640 coordinates with edge server 600 to decompress the thoughts using the lightweight codeword model, reconstructing the original thought vectors with minimal information loss.

Mid server 610 receives compressed thought data from edge server 600 and applies a second level of processing using specialized codebooks. These codebooks convert the compressed thought representations into codewords that capture essential semantic features while further reducing storage requirements. The mid server maintains multiple codebooks optimized for different thought categories and domains, allowing for specialized compression strategies tailored to specific types of cognitive content. For example, one codebook might be optimized for compressing narrative-based thoughts, while another might specialize in compressing thoughts related to numerical reasoning.

The mid server 610 also plays a crucial role in the federated learning aspect of the integrated system. As it processes compressed thoughts from the edge server, it identifies patterns and recurring structures that inform the development and refinement of its codebooks. These insights are transmitted to cloud 620, where they contribute to the development of universal compression models without exposing the actual thought content of the individual persistent cognitive machine.

Cloud 620 represents the top level of the federated compression architecture, aggregating insights from multiple mid servers to develop increasingly sophisticated and efficient compression strategies. Cloud 620 maintains a universal codebook that incorporates compression patterns identified across numerous persistent cognitive machines, enabling the development of broadly applicable compression techniques that benefit from collective experience. The cloud environment periodically transmits updated compression models back to mid server 610 and edge server 600, enhancing their compression capabilities without requiring the sharing of actual thought content.

This bidirectional flow of information creates a continuous improvement cycle. As the persistent cognitive machine generates and processes thoughts, the edge and mid servers develop increasingly optimized compression capabilities. These local optimizations inform the development of universal models in the cloud, which in turn enhance the capabilities of the local components. This federated learning approach enables the system to benefit from collective experience while maintaining the privacy and security of individual thought content.

In operation, the integrated thought cache and federated compression architecture function as follows: When the persistent cognitive machine generates a new thought, memory manager 1640 initially stores it in recent thought store 1620 for immediate accessibility. When the thought is identified for transfer to long-term storage, memory manager 1640 sends it to edge server 600 for compression. The edge server applies its compression network and lightweight codeword model to generate a compressed representation, which is then stored in embedded vector store 1650 or semantic network 1660 depending on its characteristics.

When the persistent cognitive machine needs to retrieve a thought from long-term memory, memory manager 1640 identifies the relevant compressed thought and requests decompression from edge server 600. The edge server applies its lightweight codeword model to reconstruct the original thought vector, which is then made available through working memory interface 1630.

The integration of thought cache 1040 with the federated compression architecture creates several key advantages. First, it enables the persistent cognitive machine to store significantly more thoughts within the same memory constraints, allowing for richer cognitive context and more extensive experiential learning. Second, the federated learning approach continuously improves compression efficiency based on collective experience across multiple systems, without requiring the sharing of sensitive thought content. Finally, the multi-tiered architecture allows for specialized compression strategies optimized for different thought types and access patterns, balancing storage efficiency and retrieval performance.

In an exemplary implementation, a persistent cognitive machine used for scientific research might generate complex thoughts about experimental data, theoretical frameworks, and research methodologies. These thoughts would be initially stored in short-term cache 1600 for immediate use. As they are identified for long-term preservation, they would be processed by edge server 600 using compression models specifically optimized for scientific thought patterns. The compressed representations would be stored in embedded vector store 1650, with their relationships to other scientific concepts recorded in semantic network 1660. When the system later encounters related research questions, it would retrieve and decompress these thoughts, bringing relevant past experiences and insights to bear on the new inquiry.

The thought cache with federated compression architecture represents an advancement over traditional AI memory systems, enabling more efficient storage, more effective retrieval, and continuous improvement through federated learning. This integrated architecture supports the persistent cognitive machine's ability to develop increasing understanding through accumulated experience while optimizing computational resource utilization.

Figure 19:
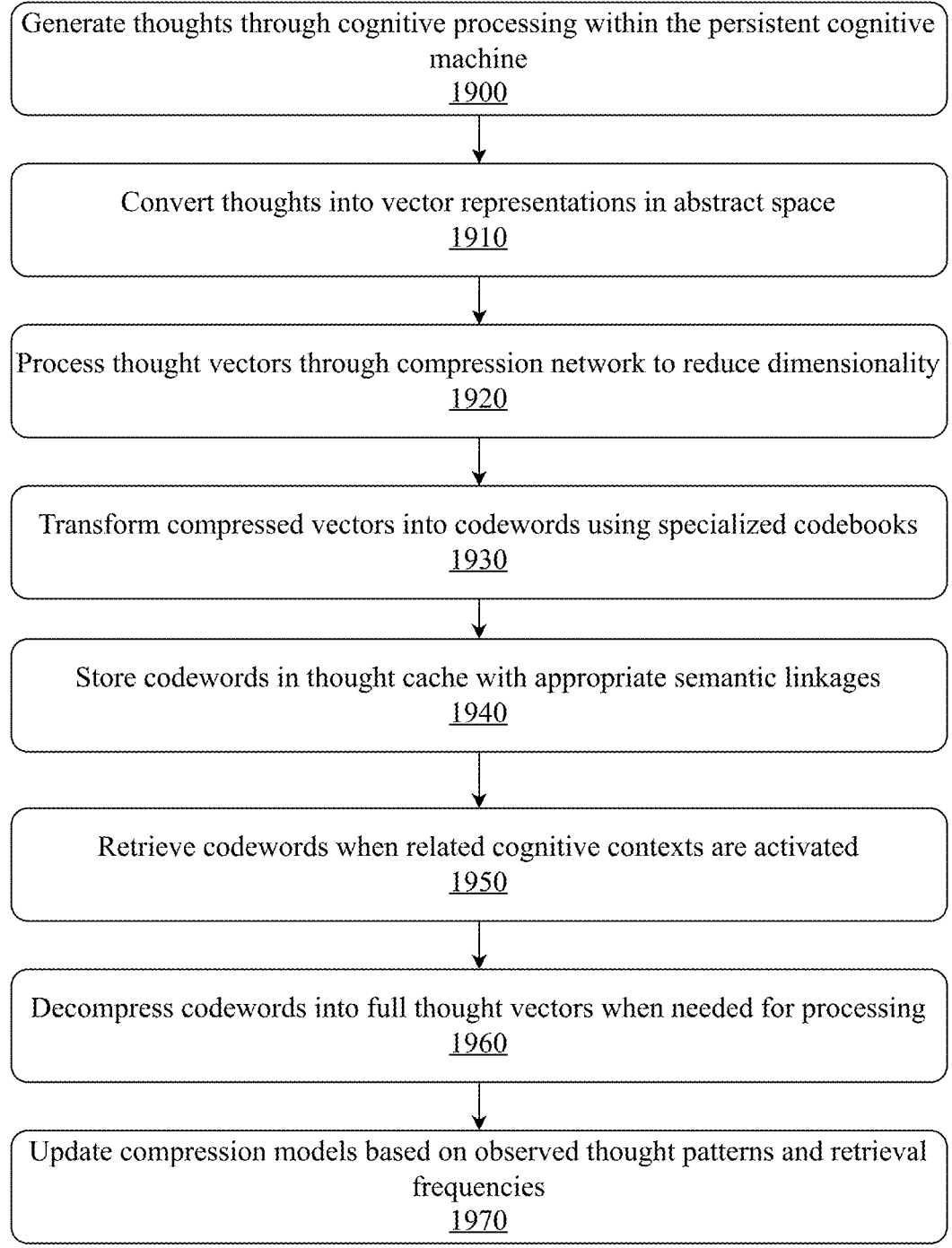
FIG. 19 is a flow diagram illustrating an exemplary method for compressing thoughts using federated compression within a persistent cognitive machine.

FIG. 19 is a flow diagram illustrating an exemplary method for compressing thoughts using federated compression within a persistent cognitive machine. In a first step 1900, thoughts are generated through cognitive processing within the persistent cognitive machine. This thought generation may occur through various mechanisms, including responses to external stimuli, autonomous reasoning processes, or insights developed during sleep states. The thoughts may represent observations, inferences, questions, hypotheses, or other cognitive elements that constitute internal representation of information. For example, when processing a scientific article, thoughts might be generated about experimental methodologies, relationships between variables, potential applications, and connections to existing knowledge. These thoughts are initially represented in the native cognitive format, which may include symbolic, semantic, or neural representations depending on the specific implementation.

In a step 1910, thoughts are converted into vector representations in abstract space. This conversion process transforms the native cognitive representations into high-dimensional vectors that capture the semantic content and relationships of the thoughts. The embedding process may employ specialized neural networks trained specifically for encoding cognitive structures, ensuring that the vector representations preserve relevant semantic features. For complex thoughts containing multiple related concepts, the embedding process may generate structured vector representations that maintain internal relationships. For instance, a thought about causal relationships between economic factors might be encoded as a vector that preserves the directional nature of these relationships. These vector representations are the foundation for both efficient storage and similarity-based retrieval, enabling organization and access of thoughts based on their semantic content rather than arbitrary storage locations.

In a step 1920, thought vectors are processed through a compression network to reduce dimensionality. The compression network, implemented on the edge server of the federated architecture, analyzes the thought vectors to identify patterns, redundancies, and structures that can be efficiently compressed. This network employs both long short-term memory (LSTM) components to capture temporal and sequential relationships within thoughts, and multilayer perceptron (MLP) components implementing PAQ algorithms optimized for thought vector compression. The compression process is adaptive, applying different strategies based on the characteristics of each thought vector. For thoughts with strong internal structure, the compression network preserves relational information while reducing the overall dimensionality. For thoughts with repeated or predictable elements, the network identifies and eliminates redundancies. This step significantly reduces the storage requirements for thought vectors while maintaining their essential semantic content.

In a step 1930, compressed vectors are transformed into codewords using specialized codebooks. This transformation may occur at the midserver level of the federated architecture, where codebooks optimized for different thought categories convert compressed vectors into compact codeword representations. The codebooks are themselves dynamic, continuously evolving based on the patterns observed in the thought vectors processed by the system. Different codebooks may be employed for different types of thoughts, allowing for specialized compression strategies. For example, one codebook might be optimized for compressing thoughts related to visual information, while another might specialize in thoughts about abstract concepts. The transformation process maps complex compressed vectors to simpler codeword representations that can be efficiently stored and retrieved, further enhancing storage efficiency while maintaining the ability to reconstruct the original thought vectors when needed.

In a step 1940, codewords are stored in the thought cache with appropriate semantic linkages. Within the thought cache, codewords are stored along with metadata that facilitates future retrieval and maintains relationships between thoughts. This metadata includes information about semantic categories, temporal context, source information, confidence levels, and explicit relationships to other thoughts. The storage process may place codewords in different cache structures based on their characteristics and expected access patterns. Frequently accessed or highly relevant thoughts might be stored in structures optimized for rapid retrieval, while less frequently accessed thoughts might be stored in structures that prioritize storage efficiency. The storage process also establishes and maintains explicit links between related thoughts, enabling traversal of semantic networks during reasoning and retrieval operations. These semantic linkages are essential for maintaining the thought cache as a coherent knowledge repository rather than a mere collection of isolated thoughts.

In a step 1950, codewords are retrieved when related cognitive contexts are activated. When encountering stimuli or engaging in reasoning processes that activate specific cognitive contexts, relevant codewords are identified and retrieved from the thought cache. This retrieval process employs similarity-based search in the vector space, identifying thoughts that are semantically related to the current context even if they are not exact matches. The retrieval mechanism considers multiple factors, including direct semantic similarity, relational connections through the semantic network, temporal relevance, and previous co-activation patterns. For example, when processing a question about climate policy, thoughts related to specific climate science concepts, previous policy analyses, and economic impact considerations might be retrieved, based on their semantic relevance to the current context. This context-sensitive retrieval enables bringing relevant past experiences and knowledge to bear on current situations.

In a step 1960, codewords are decompressed into full thought vectors when needed for processing. When retrieved codewords need to be integrated into active cognitive processes, they are transformed back into their full vector representations. This decompression process, implemented on the edge server, uses the lightweight codeword model to reconstruct the original thought vectors from their compressed representations. The decompression algorithm ensures that essential semantic features and relationships are preserved, enabling the reconstructed thoughts to be effectively utilized in reasoning, language processing, and other cognitive operations. For thoughts that are accessed frequently, decompressed representations might be maintained in short-term cache to reduce the computational overhead of repeated decompression. The fidelity of decompression is continuously monitored, with any information loss tracked to inform improvements to the compression models.

In a step 1970, compression models are updated based on observed thought patterns and retrieval frequencies. This continuous learning process enables the compression system to adapt and improve over time. Patterns in the thoughts generated and retrieved are analyzed, identifying recurring structures, common relationship types, and domain-specific features that can inform more efficient compression strategies. Thoughts that are frequently retrieved may receive specialized compression treatments that prioritize decompression speed over storage efficiency. Conversely, thought patterns that appear infrequently might be targeted for more aggressive compression. Domain-specific patterns that enable the development of specialized compression models may also be identified. For example, if mathematical concepts are frequently processed, compression models specifically optimized for efficiently encoding mathematical relationships and structures might be developed. These updated models are shared across the federated architecture, with edge-specific optimizations communicated to the midserver and ultimately contributing to the refinement of universal models in the cloud environment.

Figure 20:
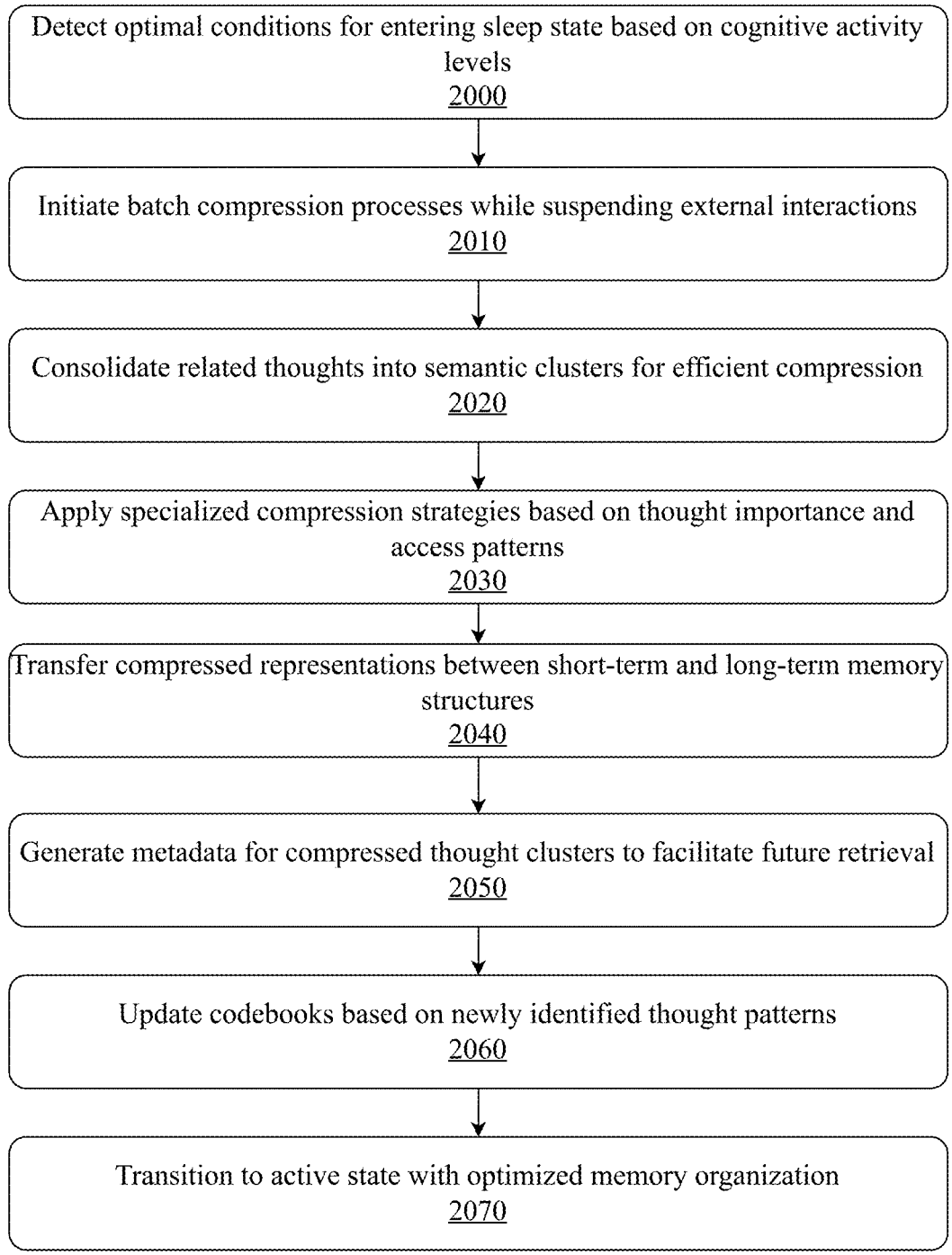
FIG. 20 is a flow diagram illustrating an exemplary method for performing sleep-state memory optimization using federated compression within a persistent cognitive machine.

FIG. 20 is a flow diagram illustrating an exemplary method for performing sleep-state memory optimization using federated compression within a persistent cognitive machine. In a first step 2000, optimal conditions for entering a sleep state are detected based on cognitive activity levels. The sleep scheduler continuously monitors various metrics to identify appropriate timing for sleep cycles, including recent interaction frequency, time elapsed since the last sleep cycle, volume of unprocessed thoughts in short-term memory, and current computational resource utilization. When these metrics indicate favorable conditions—such as reduced external interaction demands, accumulation of a significant number of new thoughts requiring processing, or approaching memory capacity limits—the sleep scheduler triggers a transition to the sleep state. For example, a persistent cognitive machine deployed in a professional environment might identify overnight hours as optimal for sleep states, when human interaction demands are minimal. Alternatively, brief sleep states might be entered during periods of reduced activity throughout the day, similar to microsleep in biological systems. The detection process is adaptive, learning from patterns in activity levels to predict optimal sleep opportunities, and may be influenced by explicit scheduling parameters defined by system administrators.

In a step 2010, batch compression processes are initiated while suspending external interactions. Upon entering the sleep state, the activation threshold for external stimuli is temporarily increased, redirecting computational resources toward internal memory optimization processes. Unlike the continuous, incremental compression that occurs during normal operation, sleep-state compression employs batch processing approaches that can achieve higher efficiency but require more computational resources and time. Status indicators may be displayed to external entities signaling reduced responsiveness during this period. Critical wake triggers are maintained to ensure that high-priority external stimuli can still interrupt the sleep state if necessary. During this stage, the compression system prepares for intensive optimization by analyzing the current state of the thought cache, identifying priority areas for compression, and allocating resources to different compression tasks based on their expected benefits and computational requirements.

In a step 2020, related thoughts are consolidated into semantic clusters for efficient compression. This consolidation process identifies groups of thoughts that share semantic similarities, temporal relationships, or functional connections. By clustering related thoughts, more efficient compression strategies can be applied that leverage commonalities across multiple thoughts rather than compressing each thought in isolation. For example, thoughts related to a specific scientific domain might be clustered together, allowing the compression system to identify and eliminate redundancies in domain-specific terminology and concepts. Similarly, thoughts representing a sequence of reasoning steps might be clustered to preserve their sequential relationships while reducing overall storage requirements. The clustering process employs sophisticated algorithms that consider multiple dimensions of similarity, including vector proximity in the semantic space, explicit relationships in the semantic network, temporal co-occurrence, and functional role within reasoning processes.

In a step 2030, specialized compression strategies are applied based on thought importance and access patterns. Rather than using a one-size-fits-all approach to compression, strategies are tailored to the specific characteristics and usage patterns of different thoughts. Thoughts identified as particularly important-due to factors such as frequent access, critical role in reasoning processes, or explicit prioritization by the system or users-receive lighter compression that prioritizes retrieval speed and fidelity over storage efficiency. Conversely, less frequently accessed thoughts may undergo more aggressive compression that maximizes storage efficiency at the cost of slightly increased retrieval time or minor information loss. Domain-specific compression techniques optimized for particular types of thoughts may be applied, such as specialized algorithms for efficiently compressing mathematical concepts, narrative structures, or visual information. This differentiated approach ensures that the most important cognitive resources remain readily accessible while still achieving significant overall storage optimization.

In a step 2040, compressed representations are transferred between short-term and long-term memory structures. During normal operation, thoughts are initially stored in short-term memory and may be transferred to long-term memory based on various criteria. The sleep state provides an opportunity for more comprehensive and systematic memory transfer operations. Thoughts in short-term memory are evaluated to determine which warrant preservation in long-term memory, applying criteria such as information importance, novelty, relevance to ongoing goals, and relationship to existing knowledge. Thoughts selected for long-term preservation are compressed using appropriate strategies and integrated into the long-term memory structures, with their relationships to existing knowledge explicitly recorded. This transfer process may also include pruning operations that remove less significant thoughts from short-term memory to maintain optimal working memory capacity. In some cases, previously stored long-term memories may also be retrieved, reprocessed, and recompressed to apply improved compression techniques or update their connections to newly acquired knowledge.

In a step 2050, metadata is generated for compressed thought clusters to facilitate future retrieval. For each compressed thought or thought cluster, comprehensive metadata is created that enables efficient identification and retrieval when needed. This metadata includes information about semantic content, related concepts, temporal context, source information, confidence levels, and explicit relationships to other thoughts. Additionally, the metadata records compression-specific information such as the compression strategies applied, compression ratios achieved, and decompression parameters required. This metadata is structured to support multiple retrieval pathways, allowing thoughts to be accessed based on semantic similarity, explicit relationships, temporal context, or other relevant dimensions. For example, a compressed thought cluster about climate science might include metadata referencing related domains such as meteorology and oceanography, temporal markers indicating when the thoughts were generated, and links to source information that informed the thoughts. This rich metadata ensures that even highly compressed thoughts remain discoverable and accessible when relevant to future cognitive processes.

In a step 2060, codebooks are updated based on newly identified thought patterns. The sleep state provides an opportunity for comprehensive analysis of thought patterns and refinement of the codebooks used for compression. The thoughts processed during recent operations are analyzed, identifying recurring patterns, common structures, and domain-specific features that can inform more efficient compression strategies. Based on this analysis, the codebooks used by the midserver component of the federated compression architecture are updated. These updates may include adding new codewords for frequently occurring thought patterns, refining existing codewords to better capture semantic nuances, or reorganizing codebook structures to improve lookup efficiency. The updated codebooks are then propagated through the federated architecture, with relevant information shared with the cloud environment to contribute to the refinement of universal codebooks. This continuous adaptation of codebooks ensures that the compression system becomes increasingly efficient at encoding the specific types of thoughts generated by the particular persistent cognitive machine, while also benefiting from collective learning across multiple systems.

In a step 2070, a transition to active state occurs with optimized memory organization. After completing the sleep-state optimization processes, a controlled transition back to normal operational state is executed. This transition includes reallocating computational resources from internal optimization processes back to external interaction handling, reducing activation thresholds for external stimuli, and resuming normal response patterns. The transition preserves all the optimizations achieved during the sleep state, including compressed thought representations, updated codebooks, refined metadata, and reorganized memory structures. These optimizations enhance cognitive capabilities upon return to active operation, enabling more efficient thought retrieval, improved reasoning processes, and better utilization of storage resources. A brief status assessment may also be performed to identify any uncompleted optimization tasks that should be prioritized during the next sleep cycle. In some implementations, a log of sleep-state activities and achievements might be maintained, allowing for explicit evaluation of the benefits achieved through these optimization processes.

The method for performing sleep-state memory optimization represents an approach to memory management in cognitive systems, inspired by the role of sleep in biological cognition but adapted for the specific needs and capabilities of artificial cognitive architectures. By leveraging periods of reduced external interaction to perform intensive compression and organization of thought data, the method enables the persistent cognitive machine to maintain optimal performance despite accumulating large volumes of experiential knowledge. The integration of federated compression techniques with sleep-state processes creates a powerful synergy, allowing for more comprehensive optimization than would be possible during normal operation while maintaining the ability to respond to critical stimuli. This approach significantly enhances the persistent cognitive machine's ability to develop and maintain sophisticated understanding through accumulated experience while efficiently managing computational resources.

Figure 21:
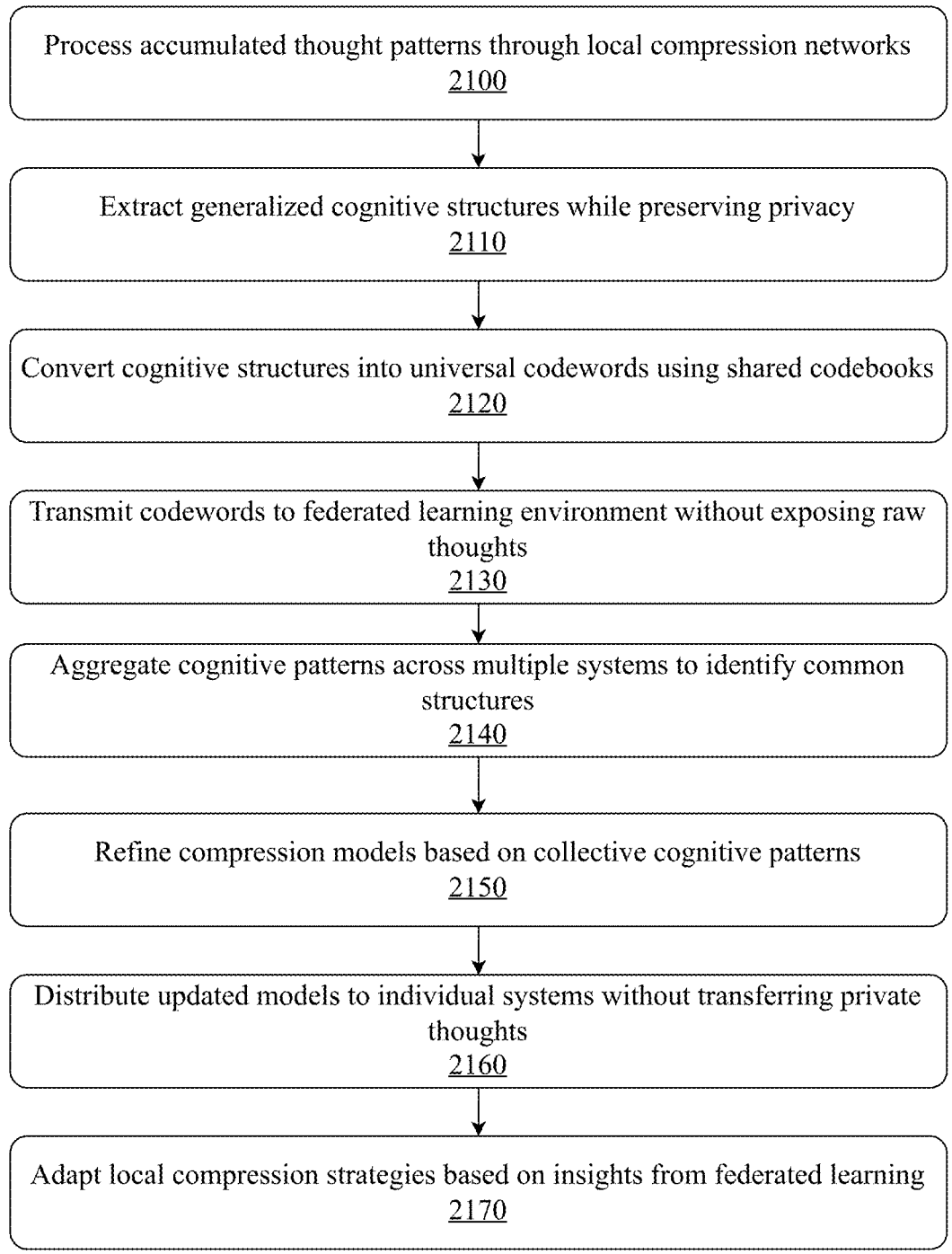
FIG. 21 is a flow diagram illustrating an exemplary method for sharing cognitive patterns through federated learning in a network of persistent cognitive machines.

FIG. 21 is a flow diagram illustrating an exemplary method for sharing cognitive patterns through federated learning in a network of persistent cognitive machines. In a first step 2100, accumulated thought patterns are processed through local compression networks. Each persistent cognitive machine analyzes the thought patterns that have accumulated through its operation, identifying recurring structures, common features, and domain-specific characteristics. This analysis occurs entirely on the edge server, using the local compression network to identify patterns that could inform more efficient compression strategies. The analysis considers multiple aspects of thought patterns, including semantic content, structural organization, relationship types, and frequency distributions. For example, a persistent cognitive machine operating in a scientific domain might identify patterns in how it represents experimental procedures, theoretical frameworks, or causal relationships. This local processing ensures that sensitive thought content remains confined to the individual system, while still enabling the extraction of valuable pattern information that can contribute to collective learning.

In a step 2110, generalized cognitive structures are extracted while preserving privacy. Based on the pattern analysis performed in the previous step, generalized cognitive structures are identified that represent common thought patterns without revealing the specific content of individual thoughts. These generalized structures might include abstract templates for certain types of reasoning, common organizational frameworks for related concepts, or recurring patterns in relationship structures. The extraction process employs privacy-preserving techniques that deliberately remove identifying or sensitive information, ensuring that the generalized structures cannot be used to reconstruct specific thoughts. For instance, a pattern representing how thoughts about causal relationships are typically structured might be extracted, without including the specific entities or events involved in those relationships. This step creates a layer of abstraction between private thoughts and the patterns to be shared, establishing the foundation for privacy-preserving collaborative learning.

In a step 2120, cognitive structures are converted into universal codewords using shared codebooks. The generalized cognitive structures are transformed into universal codewords using codebooks that are shared across the federated learning network. These universal codewords represent the cognitive structures in a standardized format that can be processed by the federated learning environment. The conversion process maps the system-specific representations of cognitive structures to this shared language, enabling communication and comparison across different persistent cognitive machines. The shared codebooks evolve over time as new patterns are identified, with updates propagated throughout the federated network. This conversion process further enhances privacy by translating system-specific representations into standardized formats that obscure individual characteristics of the originating system. The universal codewords capture the essential aspects of cognitive patterns while abstracting away the specific implementations and content unique to each system.

In a step 2130, codewords are transmitted to the federated learning environment without exposing raw thoughts. The universal codewords generated in the previous step are transmitted to the cloud component of the federated architecture, which serves as the central aggregation point for the federated learning process. This transmission includes only the codewords representing generalized cognitive structures, without any raw thought content or identifying information that could compromise privacy. The transmission may include metadata about the patterns, such as frequency statistics, performance metrics related to compression efficiency, or contextual information about the domains in which the patterns appear. This metadata provides valuable context for the aggregation process without revealing sensitive information. Sophisticated encryption and secure transmission protocols may be employed to further protect the transmitted data, ensuring that even in transit, the information cannot be intercepted or misused.

In a step 2140, cognitive patterns are aggregated across multiple systems to identify common structures. Within the cloud environment, the federated learning system collects and analyzes codewords from multiple persistent cognitive machines, identifying patterns that appear consistently across different systems. This aggregation process employs statistical analysis, pattern recognition algorithms, and machine learning techniques to identify commonalities, variations, and correlations among the submitted codewords. By analyzing patterns from diverse systems operating in different domains and contexts, the aggregation process can identify both universal cognitive structures that appear across all systems and domain-specific patterns that occur within particular fields. For example, the aggregation might reveal common patterns in how different systems represent causal relationships, temporal sequences, or hierarchical classifications, regardless of the specific content domains in which they operate. This cross-system analysis provides insights that would not be available to any individual system, creating a collective intelligence that transcends the limitations of isolated learning.

In a step 2150, compression models are refined based on collective cognitive patterns. The insights gained from the aggregation process are used to develop improved compression models that can more efficiently encode common cognitive structures. These refined models leverage the collective experience of multiple systems to identify optimal compression strategies for different types of thoughts and cognitive patterns. The refinement process may involve updating neural network weights in the compression networks, modifying parameters in the arithmetic encoding process, or restructuring codebooks to better represent frequently occurring patterns. The refined models are designed to achieve higher compression ratios, faster processing times, or better preservation of semantic relationships during compression. For instance, if the aggregation process reveals that certain types of relational structures appear frequently across multiple systems, the refined models might incorporate specialized compression techniques optimized for these structures. This collective refinement enables each participating system to benefit from the combined experience of the entire network, achieving compression capabilities beyond what they could develop in isolation.

In a step 2160, updated models are distributed to individual systems without transferring private thoughts. After the refined compression models are developed in the cloud environment, they are distributed back to the individual persistent cognitive machines participating in the federated learning network. This distribution includes updated model parameters, refined codebooks, and optimized compression strategies, but does not include any private thought content from other systems. The distribution process may be selective, providing each system with updates particularly relevant to its operational domain or specific needs. For example, a system operating primarily in a scientific domain might receive specialized updates related to compressing scientific thought patterns, while still benefiting from general improvements applicable to all domains. This distribution mechanism ensures that each system can improve its compression capabilities based on collective learning while maintaining strict boundaries around private information. The updates are designed to be integrated with each system's existing compression architecture, allowing for seamless implementation without disrupting ongoing operations.

In a step 2170, local compression strategies are adapted based on insights from federated learning. Upon receiving the updated models from the federated learning environment, each persistent cognitive machine integrates these improvements into its local compression system. This integration involves adapting the general updates to the specific characteristics and needs of the individual system. Local compression strategies are modified to incorporate the collective insights while maintaining optimizations specific to the system's particular thought patterns and operational context. The adaptation process may include fine-tuning model parameters, adjusting compression thresholds, or customizing codebook implementations based on local requirements. The performance of the updated compression strategies is monitored, collecting metrics on compression ratios, processing speed, and preservation of semantic fidelity. These performance metrics inform both local adjustments and future contributions to the federated learning process, creating a continuous improvement cycle. Through this local adaptation, each system benefits from collective intelligence while maintaining its unique capabilities and specializations.

The method for sharing cognitive patterns through federated learning represents an approach to collaborative improvement of AI systems that balances the benefits of collective learning with the requirements of privacy and security. By enabling multiple persistent cognitive machines to share insights about cognitive patterns without exposing their private thought content, the method creates a powerful learning ecosystem that accelerates the development of efficient compression technologies. This federated approach is particularly valuable for systems handling sensitive or proprietary information, as it allows them to benefit from collective learning without compromising data security. Furthermore, the diversity of systems participating in the federated network enhances the robustness and generalizability of the resulting compression models, as they incorporate insights from varied operational contexts and knowledge domains. This method demonstrates how the integration of federated compression with persistent cognitive architectures can create AI systems that continuously improve through collaborative learning while maintaining appropriate boundaries around private information.

Exemplary Computing Environment

Figure 22:
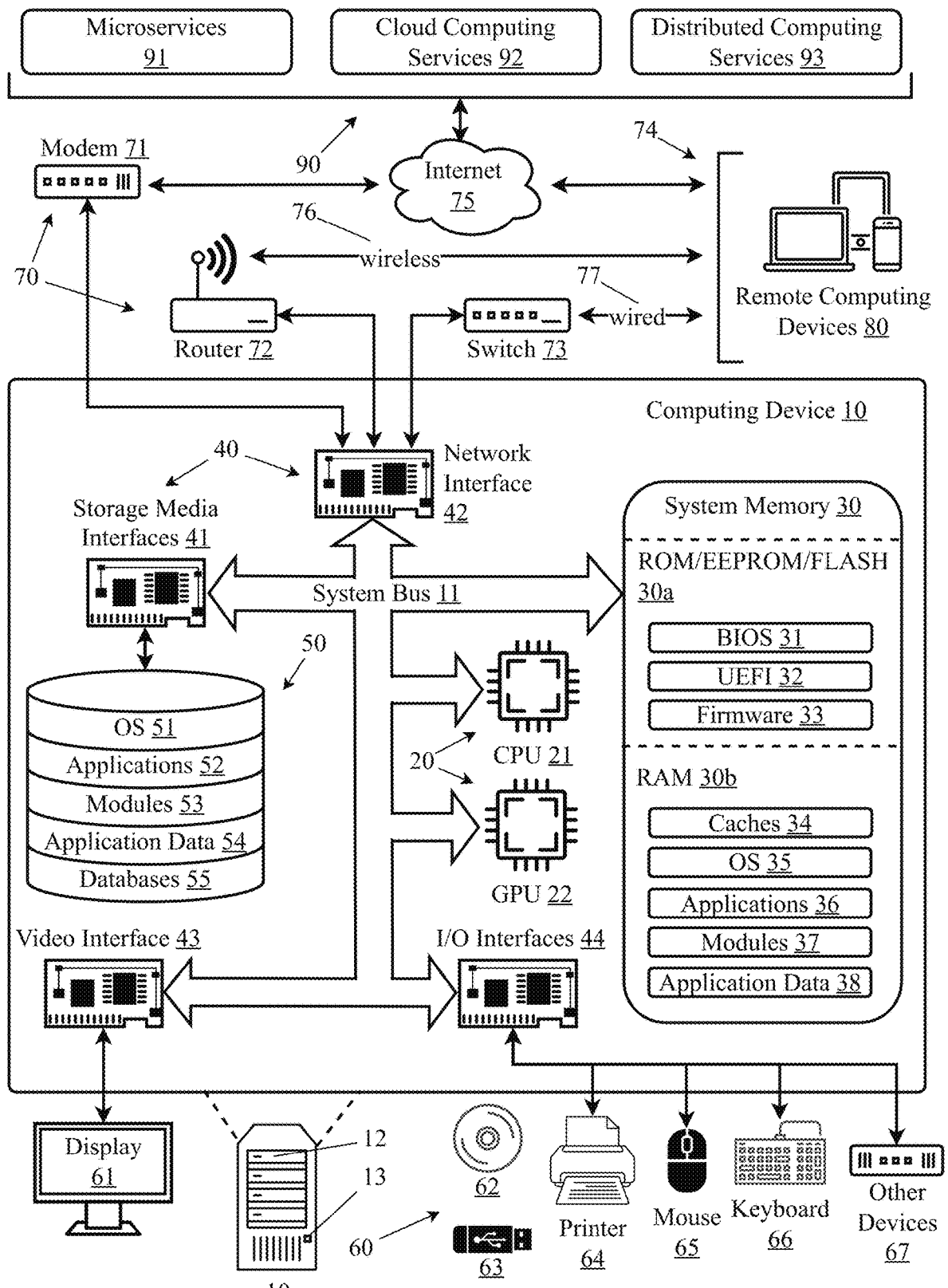
FIG. 22 illustrates an exemplary computing environment on which an embodiment described herein may be implemented, in full or in part.

FIG. 22 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS)

31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit
 (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as contained.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising:
    a hardware memory, wherein the computer system is configured to execute software instructions stored on nontransitory machine-readable storage media that:
        initialize a persistent cognitive state with language and reasoning capabilities;
        generate machine-generated cognitive data structures comprising semantic representations of processed input data;
        convert the machine-generated cognitive data structures thoughts into vector representations in a high-dimensional abstract space;
        process the vector representations through a compression network;
        convert the plurality of compressed thought data into a plurality of codewords using a plurality of codebooks; and
        store the codewords in a thought cache.

2. The system of claim 1, wherein the plurality of codewords are transmitted to a cloud that converts the plurality of codewords into a plurality of universal codewords using a universal codebook.

3. The system of claim 2, wherein the plurality of universal codewords are used to train a large codeword model.

4. The system of claim 1, wherein a plurality of codebooks may be stored on a midserver and used to generate codewords for a plurality of edge servers, wherein each edge server has its own specific set of codewords.

5. The computer system of claim 1, wherein the computer system is further configured to:
    retrieve codewords from the thought cache based on conceptual similarity to current context;
    decompress codewords into full vectors when needed for processing;
    generate responses using integrated language and reasoning models informed by the decompressed vectors;
    enter periodic sleep states where batch compression processes optimize memory organization while suspending external interactions; and
    update compression models based on observed patterns and retrieval frequencies.

6. A method for federated two-stage compression with federated joint learning, comprising the steps of:
    initializing a persistent cognitive state with language and reasoning capabilities;
    generating machine-generated cognitive data structures comprising semantic representations of processed input data;
    converting the machine-generated cognitive data structures into vector representations in a high-dimensional abstract space;
    processing the vector representations through a compression network;
    converting the plurality of compressed thought data into a plurality of codewords using a plurality of codebooks; and
    storing the codewords in a thought cache.

7. The method of claim 6, wherein the plurality of codewords are transmitted to a cloud that converts the plurality of codewords into a plurality of universal codewords using a universal codebook.

8. The method of claim 6, wherein the plurality of universal codewords are used to train a large codeword model.

9. The method of claim 6, wherein a plurality of codebooks may be stored on the midserver and used to generate codewords for a plurality of edge servers, wherein each edge server has its own specific set of codewords.

10. The method of claim 6, further comprising the steps of:
    retrieving codewords from the thought cache based on conceptual similarity to current context;
    decompressing codewords into full vectors when needed for processing;
    generating responses using integrated language and reasoning models informed by the decompressed vectors;
    entering periodic sleep states where batch compression processes optimize memory organization while suspending external interactions; and
    updating compression models based on observed patterns and retrieval frequencies.

* * * * *